United States Patent [19]

O'Dea

[11] 4,095,058
[45] June 13, 1978

[54] TELEPHONE SWITCHING SYSTEM TEST SET

[75] Inventor: Orrin Bernard O'Dea, Garden Grove, Calif.

[73] Assignee: Communication Mfg. Company, Long Beach, Calif.

[21] Appl. No.: 757,625

[22] Filed: Jan. 7, 1977

[51] Int. Cl.² .......................... H04M 3/22; H04M 1/26
[52] U.S. Cl. ............................. 179/175.2 D; 179/90 B; 328/59
[58] Field of Search ................... 179/175.2 D, 175.21, 179/90 B; 328/59

[56] References Cited

U.S. PATENT DOCUMENTS

| 3,239,612 | 3/1966 | McAllister | 179/175.2 D |
| 3,351,722 | 11/1967 | Fleming et al. | 179/175.21 |
| 3,600,525 | 8/1971 | Garrett | 179/175.21 |
| 3,700,830 | 10/1972 | Naylor et al. | 179/175.2 D |

*Primary Examiner*—Douglas W. Olms
*Attorney, Agent, or Firm*—Christie, Parker & Hale

[57] ABSTRACT

A test apparatus for forward selector switches in a telephone switching system having a telephone loop. Means detects a preselected operative condition in such telephone systems. Means generates a variable number of pulses for control of forward selector switches. The latter includes the following: A switch for closing and breaking a telephone loop to thereby form such a pulse; an indicator for indicating the desired number of pulses including one or more than one pulse; a counter; means for enabling the counter to count the formed pulses greater than one; a control circuit enables the switch to break a telephone loop upon such detection of a predetermined operative condition and for each different state of the counter, and the control circuit is also operative for terminating the breaking by the switch upon a predetermined relation existing between the indicator and counter. Also disclosed is a pulse generating means as a subcombination of the aforementioned.

34 Claims, 13 Drawing Figures (a)

(b)  NON-OPERATED CONTACTS
OPERATED CONTACTS

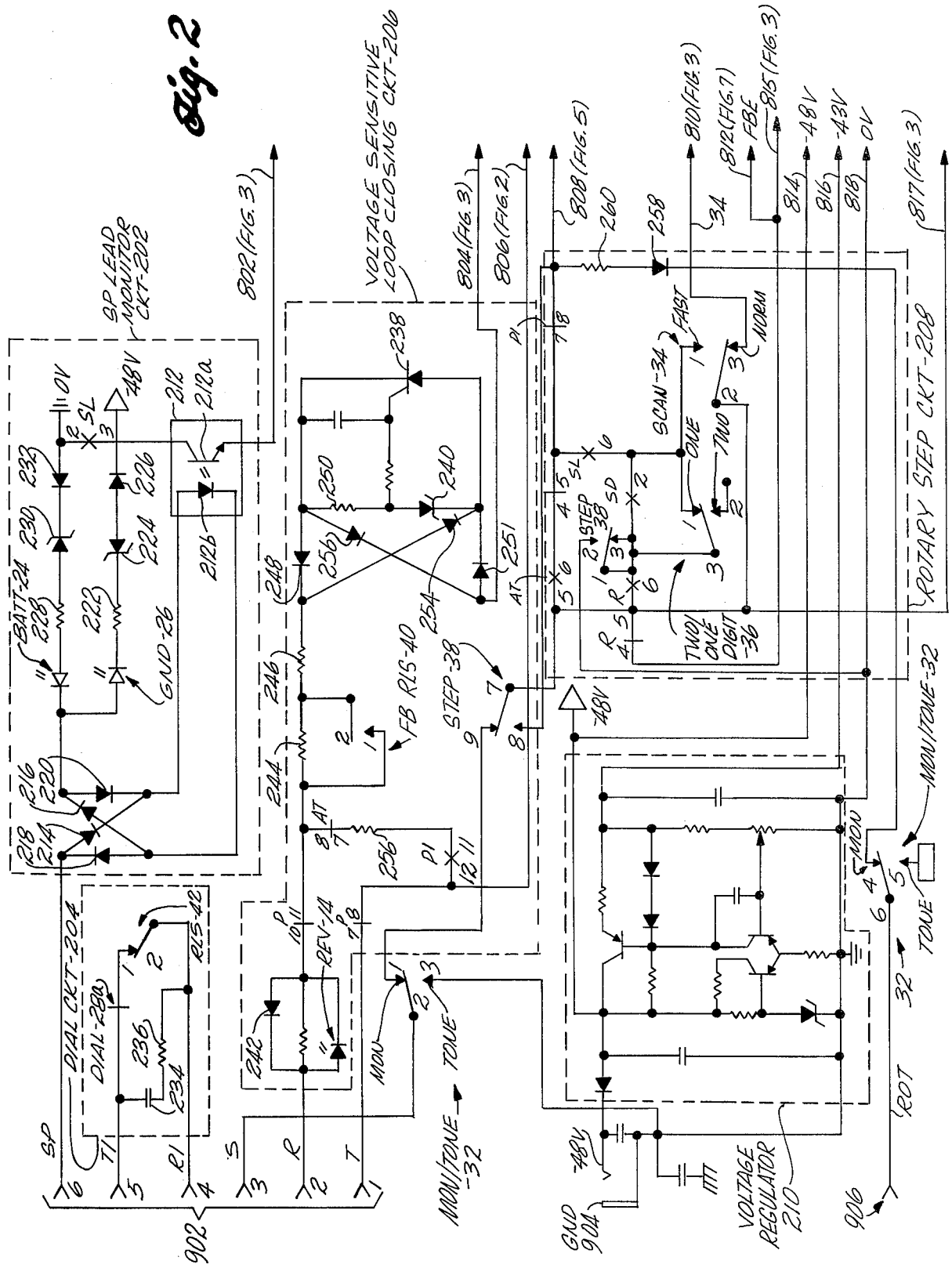

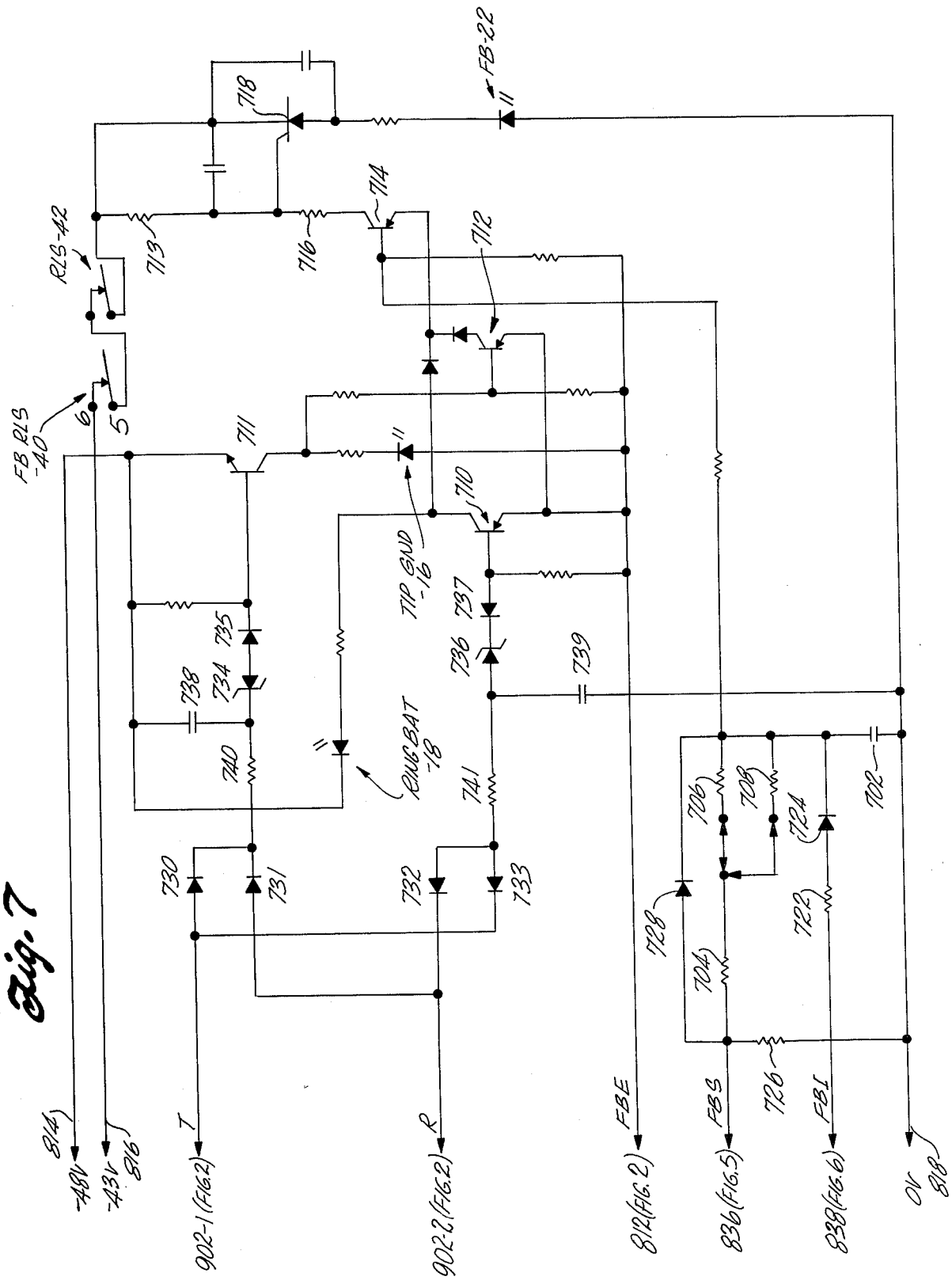

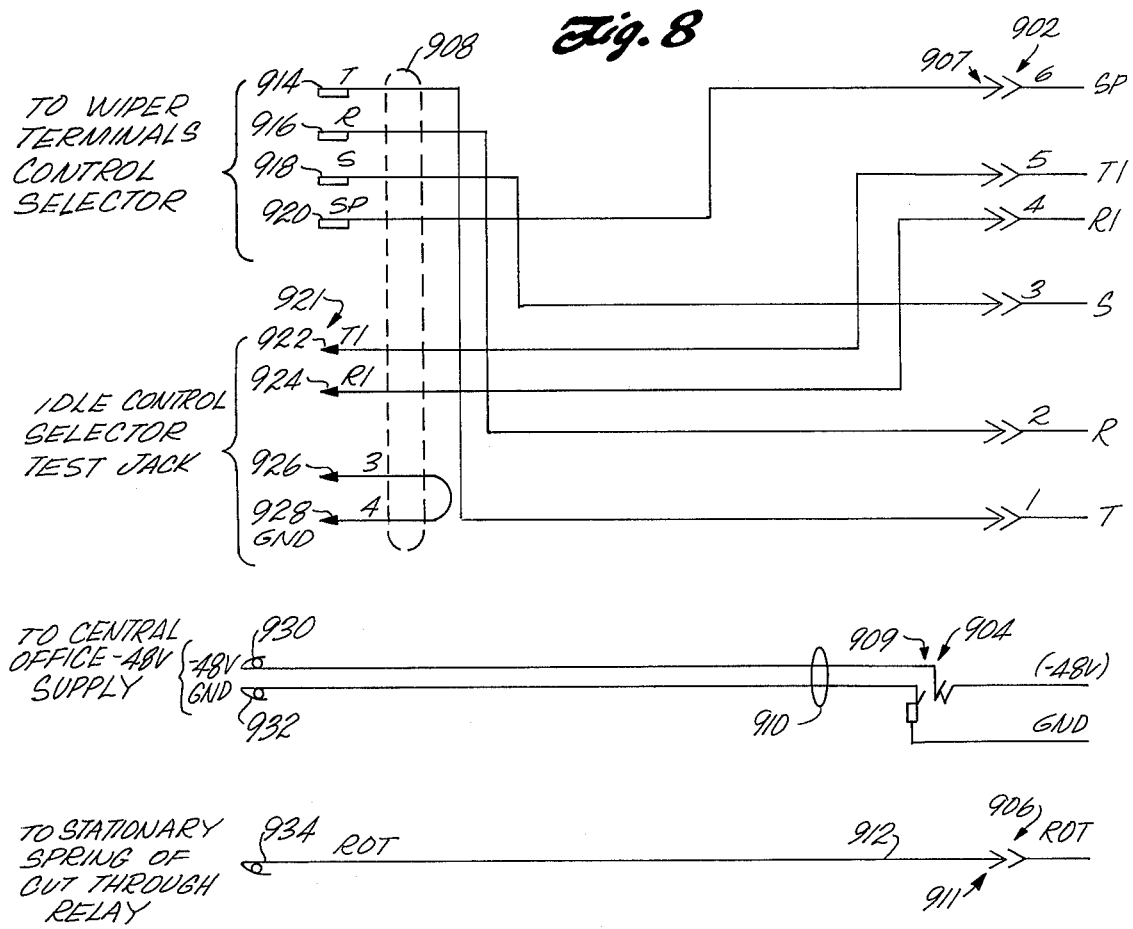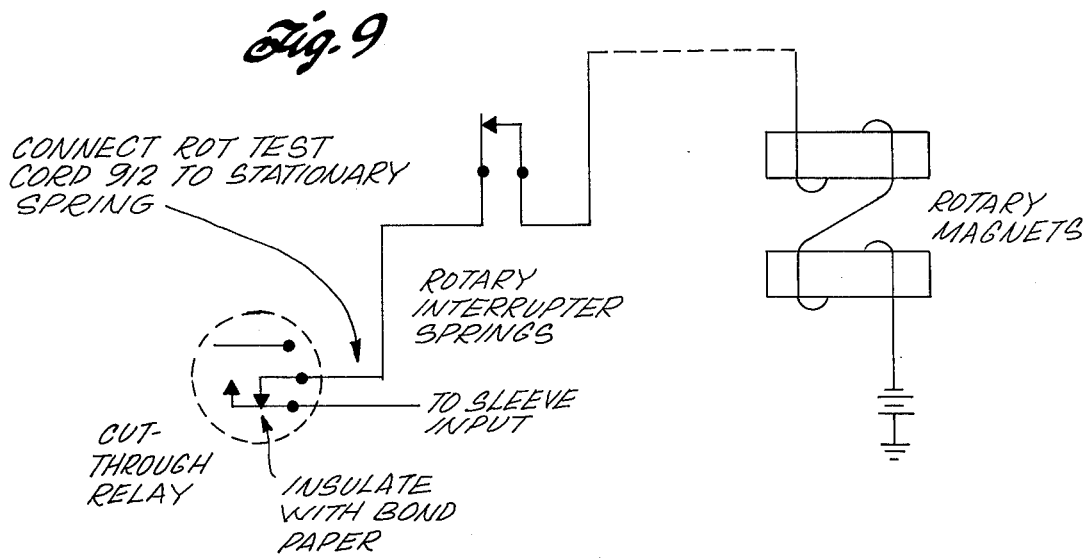

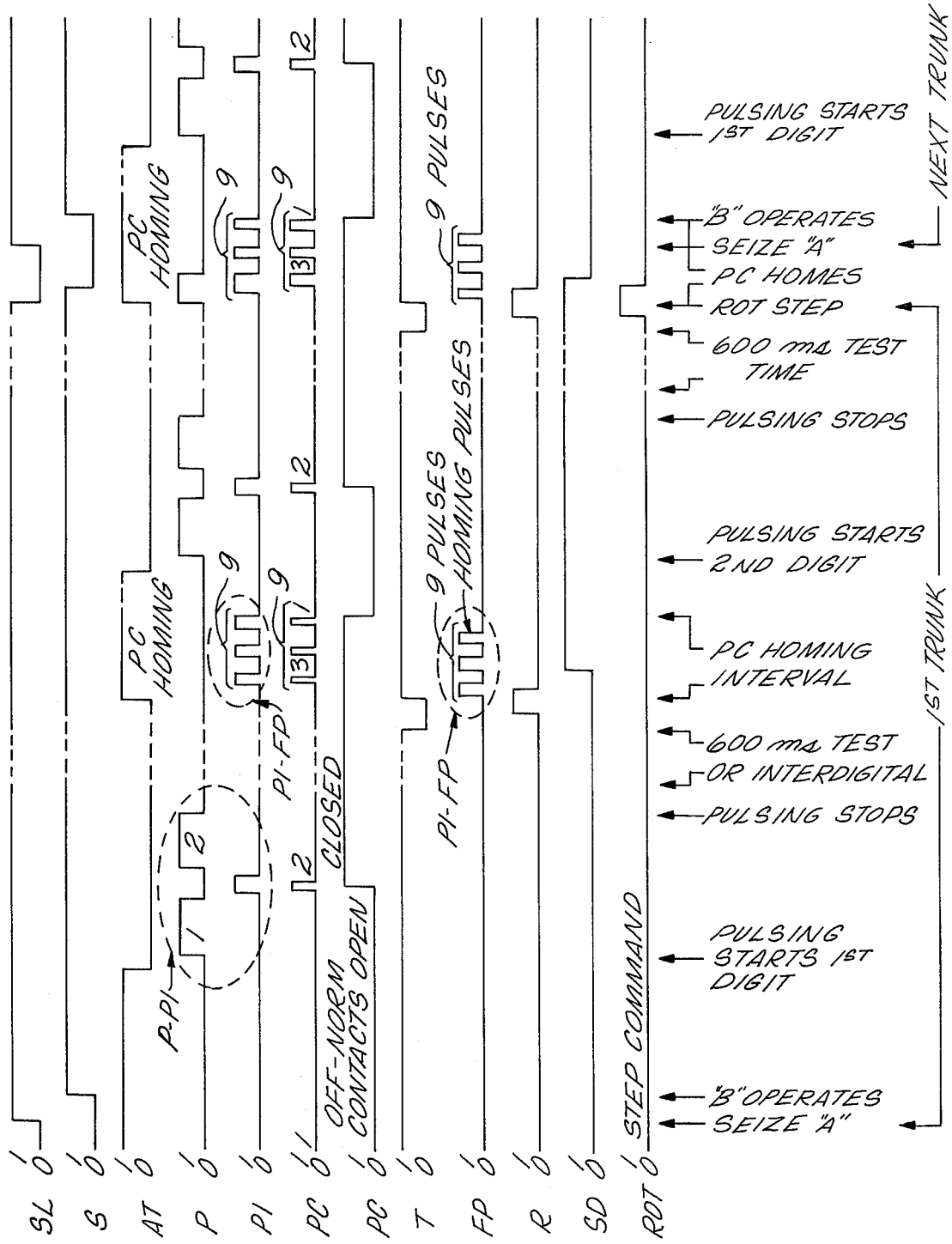

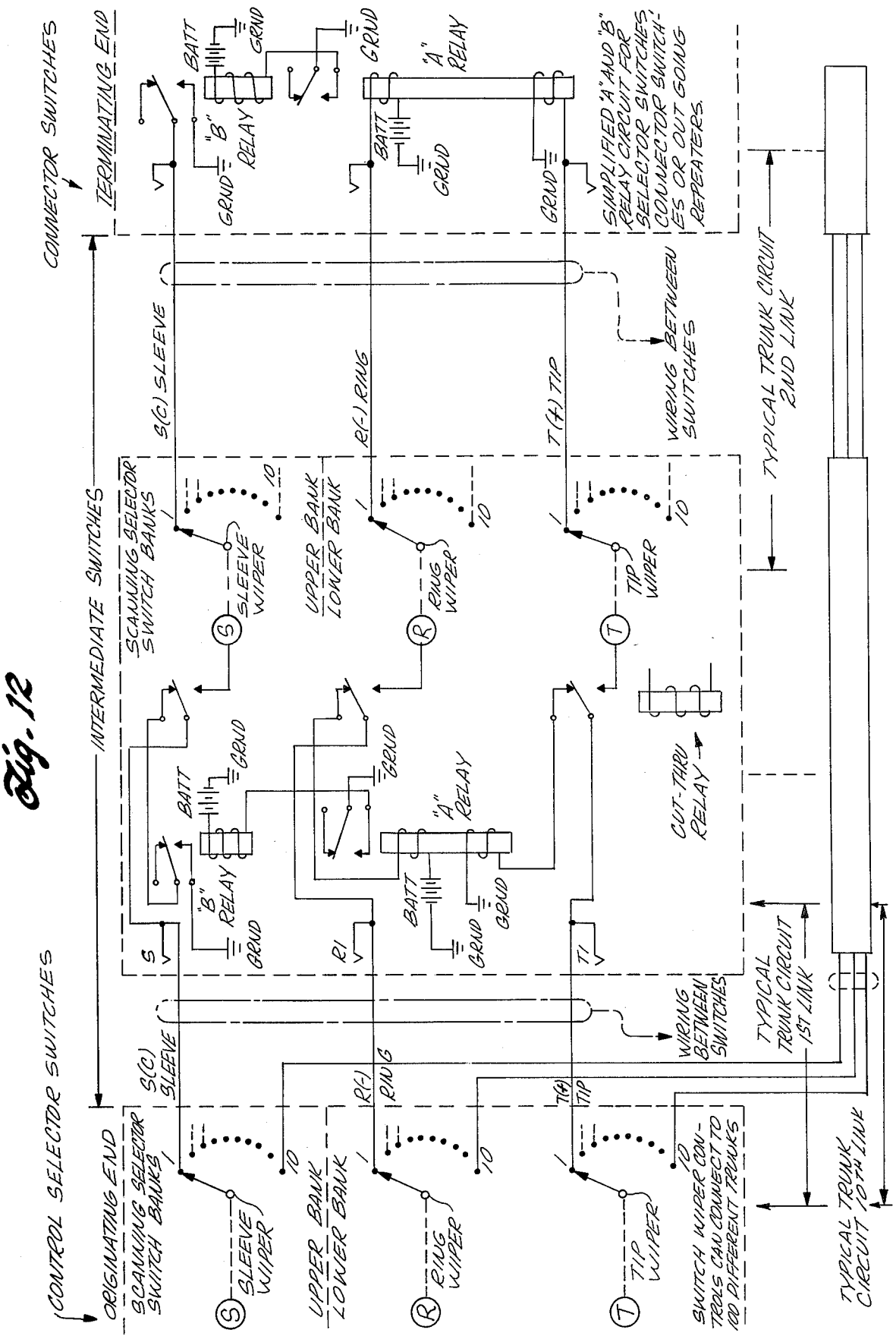

TELEPHONE SWITCHING SYSTEM TEST SET

BACKGROUND OF THE INVENTION

Circuits are known for testing control selector switches in a telephone switching system. An example of such a tester is disclosed in U.S. Pat. No. 3,627,932. However, such testers, though desirably arranged for testing proper operating conditions of the trunk circuits accessed by the control selector switch to which the test set is connected, cannot be used for sequencing and testing forward selector switches in the telephone system.

Additionally, telephone systems have a control relay for causing completion of a trunk circuit and for forming dial pulses in the telephone system. The control relay is generally known as the A relay. Prior dynamic testers have not had any way of testing to determine when the A relay is marginal, i.e., does not operate properly when marginally low values of current are applied, but which will pulse the A relay with a high value of current sufficient to ensure its proper operation for providing dial pulses forward to other switches in the system.

SUMMARY OF THE INVENTION

Briefly, an embodiment of the present invention involves a test apparatus for forward selector switches in a telephone switching system having a telephone loop. Means detects a preselected operative condition in such telephone system. A variable number of pulses generator controls forward selector switches, and includes a switch for closing and breaking a telephone loop to thereby form such a pulse, an indicator for indicating the desired number of pulses including one or more than one pulse, a counter, means for enabling the counter to count the formed pulses greater than one and a control circuit which enables the switch to break a telephone loop upon such detection of a predetermined operative condition and for each different state of the counter. The control means is also operative for terminating the breaking by the switch upon a predetermined relation between the indicator and counter.

With such an arrangement it is possible to dial, forward in the telephone system, variable numbers of dial pulses. Significantly, only the switch and not the counter need be operated for generating a single dial pulse, whereas if more than one dial pulse is required, the counter is used to determine when the desired number of dial pulses have been generated.

An embodiment of the present invention also involves the variable number of pulses generating circuit as a subcombination of the test apparatus.

DESCRIPTION OF THE DRAWINGS

FIGS. 2-7 form a schematic diagram of the test set;

FIG. 2 is a schematic of the control selector switch to test set interface and test set power supply;

FIG. 3 is a schematic of the loop/sleeve sensing and timer control circuit used in the test set;

FIG. 4 is a schematic of the timer circuits used in the test set;

FIG. 5 is a schematic of a pulse generator and digit selector circuit used in the test set;

FIG. 6 is a schematic of a sleeve relay and rotary step/second digit control circuit used in the test set;

FIG. 7 is a schematic of a false busy sensing circuit used in the test set;

FIG. 8 is a schematic diagram illustrating the test cords used for connecting the test set to the telephone system under test;

FIG. 9 is a schematic of the rotary magnets, rotary interrupter springs, and cut through relay for the telephone system to which the test set is connected;

FIGS. 10 and 11 are truth tables illustrating the sequence of operation of the test set;

FIG. 12 is a schematic and block diagram illustrating portions of a typical telephone switching system whose forward selector switches are tested using the test set according to the present invention.

GENERAL DESCRIPTION

Figure 1:
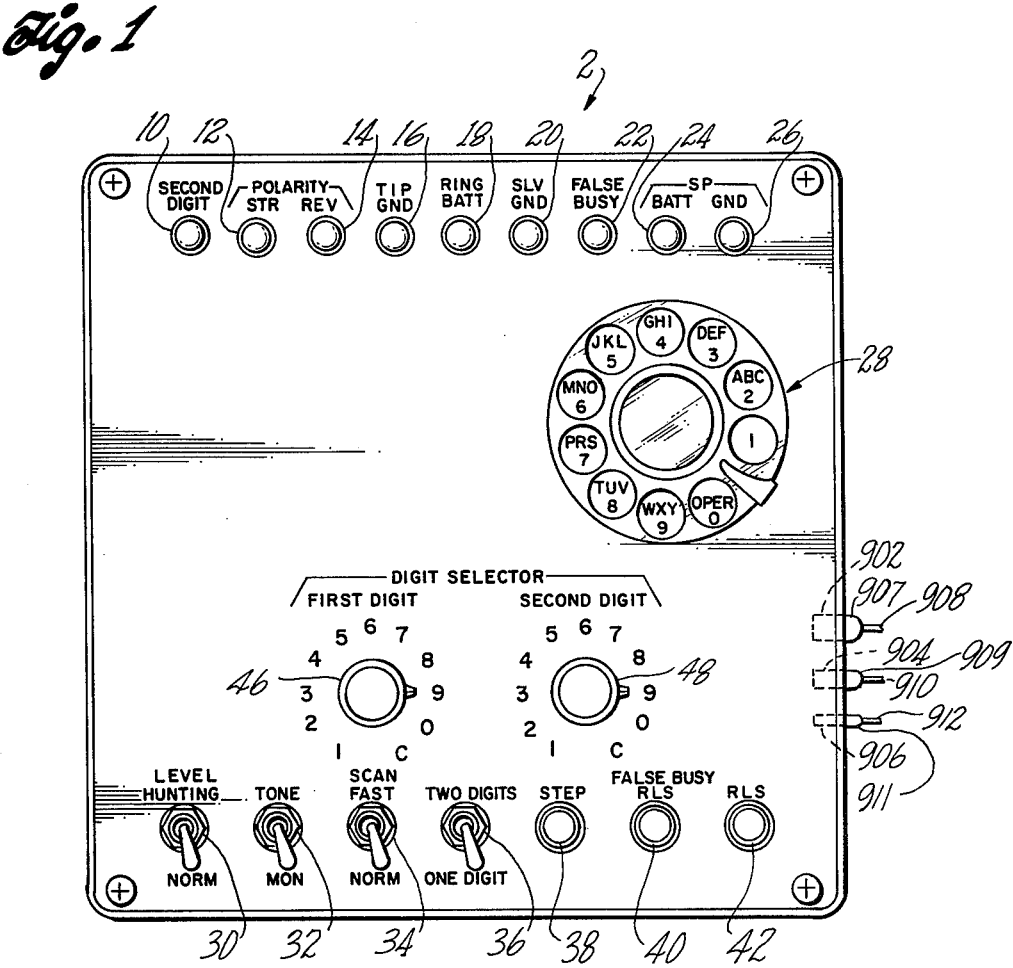
FIG. 1 is a front elevation view of a test set and embodies the present invention.

FIG. 1 discloses a test set according to the present invention for testing a control selector switch and its forward intermediate selector switches in a telephone switching system. FIGS. 2-7 disclose the circuit details. The telephone system to be tested has a conventional telephone loop with tip and ring leads which are connected to the tip and ring wipers (also called leads) of the control selector switch to which the test set in connected. Referring generally to FIGS. 2-7, S and SL relays and an optical coupler 304 are provided along with associated circuitry for detecting a preselected operative condition in the telephone system such as a non busy condition of a particular trunk under test (no ground on sleeve lead) and proper impedance conditions across the tip and ring leads (i.e., + to − from tip to ring lead).

Circuitry is provided for generating a variable number of pulses across the tip and ring leads of the telephone system under test for control and operation of the forward selector switches in the telephone system. The variable number of pulses generating circuitry includes a P relay or switch (FIG. 5) for breaking a telephone loop across the tip and ring leads to thereby form each such pulse. To this end a voltage sensitive loop closing circuit 206 (FIG. 2) is provided with operated contacts 10-11 and 7-8 of the P relay which open and close for forming the pulses. A digit selector including first and second digit switches 46 and 48 (FIGS. 1 and 5) is used for indicating the desired number of pulses which are to be dialed forward through the tip and ring circuits. The first digit switch 46 is used for indicating the number of dial pulses for one digit, whereas the second digit switch is for selecting the number of dial pulses for a second digit which is formed subsequent to the first digit. A PC stepper (FIG. 5) forms a counter. Circuitry including the P1 (FIG. 5) relay and associated circuitry enables the PC stepper to count the form pulses but only pulses greater than 1 within one particular digit. As a result, the counter is not stepped unless more than one pulse is to be formed for any particular digit, thereby prolonging the life of the PC stepper. Control circuitry including the P1 relay and its associated control circuitry, the AT timer (FIG. 4) and a connection through the PC stepper and the digit switches 46 and 48, enables the P relay to break the telephone loop by opening its non operated contacts 10-11 and 7-8 upon detection of the predetermined operative condition of the telephone system and for each different state of the PC stepper counter. Significantly the control circuitry terminates the breaking by the P relay and hence the pulses for a particular digit upon a predetermined relation being formed between the digit switch indications and the state of the PC stepper.

To be explained in more detail, the AT timer forms a pulse initiating circuit which initiates the operation and hence the first pulse formed by the P relay whenever a proper operative condition is detected on the particular trunk under test. Proper operative conditions as mentioned above include by way of example a non busy condition, i.e., no ground on the sleeve lead and proper impedance conditions across tip and ring leads, i.e., + to − from tip to ring lead.

Significantly, the P and P1 relays form a bistable circuit which has first and second states. The non operated contacts 10-11 and 7-8 of the P relay deliver a pulse for each first state of the bistable circuit. The contacts 12-11 and 10-11 of the AT relay in the AT timer and the contacts 3-2 of the P1 relay (see FIGS. 4 and 5) enable the first state of the bistable circuit upon initiation by the AT timer, or for each second state of the bistable circuit. The second state of the bistable circuit is enabled by the contacts 3-2 and 1 of the P relay and a charge path from the PC stepper and the first and second digit switches 46 and 48 to a P1 timing driver circuit 505, upon the concurrence of an indication by one of the digit switches of pulses greater than one, and the first state of the bistable circuit.

Significantly the test set also includes an arrangement whereby the A relay in the telephone system under test is marginally tested, applying a marginally low value of current thereto, and is operated with increased current for generating dial pulses forward in the telephone system. A normally closed loop between the tip and ring leads is formed by a voltage sensitive loop closing circuit 206, which includes the operated contacts 10-11 and 7-8 of the P relay, and which provides a normally high impedance across the tip and ring leads. A circuit, including a zener diode 240 and associated voltage divider resistors and a silicon controlled rectifier 238, selectively switches the loop in the voltage sensitive loop closing circuit 206 into a first low impedance condition around the voltage sensitive loop closing circuit, upon the detection of proper impedance conditions across the tip and ring leads, thereby applying the margin test to the A relay. The P relay subsequently opens and closes the dial pulse loop circuit one or more times for applying dial pulses across the tip and ring leads, thereby operating and releasing the A relay to form dial pulses for a forward selector switch in the telephone system. Significantly the operated contacts 11-12 of the P1 relay and the non operated contacts 7-8 of the AT relay switch a second substantially lower impedance, than the first low impedance, around the dial pulse loop intermediate each opening of the dial pulse loop to thereby ensure proper reoperation of the A relay during formation of the dial pulses. In this manner proper operating signals are applied to other forward switches in the telephone system.

TYPICAL TELEPHONE SWITCHING SYSTEM FOR TEST

Consider briefly the test set according to the present invention. The test set performs tests on step-by-step telephone switching equipment of the type generally depicted in FIG. 12.

At the originating end of the telephone system in which the test is to be made, a plurality of different rotary control selector switches are provided. Each control selector switch has a set of 3 wipers, a "sleeve" wiper, a "ring" wiper and a "tip" wiper. The tip, ring and sleeve wipers are also generally referred to herein as tip, ring and sleeve leads. Each wiper has 10 sets or levels of contacts, each level having 10 contacts for connection to 10 telephone trunk circuits. Only one level of contacts is shown by way of example in FIG. 12. The contacts in each level for each wiper are numbered 1-10 and the three wipers each simultaneously connect to a separate one and only one contact of the same number in a particular level.

The sleeve, ring and tip wipers are stepped from one contact to the next in order in a particular level responsive to a ground signal on an ROT conductor from the test set. The ROT conductor of the test set is connected to a rotary control magnet depicted schematically in FIG. 9 which effects the stepping of the three wipers from one contact to the next.

The control selector switches move their wiper arms from one level of contacts to another responsivve to dial pulses across T1 and R1 conductors from the test set. The T1 and R1 conductors are connected to a control selector test jack (not shown) in the telephone system. Each dial pulse, consisting of a short and open circuit, between the T1 and R1 conductors advances the wiper arms one more level. Thus 1 dial pulse between the T1 and R1 conductors selects level 1, whereas 10 selects level 10.

Each trunk has a selector switch which is positioned forward in the telephone system under test. Significantly the present invention involves a test set for testing these forward selector switches for proper operation.

Briefly the forward switches have an A relay, a B relay and a cut-through relay. When proper operating conditions exist and the trunk under test is not busy, the sleeve wiper will be open circuit and a + to − voltage exists from tip to ring wipers. These proper signal conditions are sensed by the test set which establishes a low impedance connection across the tip and ring wipers which causes the A relay of the next forward or intermediate selector switch to operate. Operation of the A relay causes its contacts to operate the B relay which in turn through its contacts applies central office battery ground on the sleeve wiper, thereby establishing a busy condition for the corresponding trunk.

The thus connected forward scanning selector switch is then pulsed by the test set using one or more open and shorts applied across the tip and ring wipers to thereby select a level and an idle trunk from such intermediate scanning selector switch. The cut-through relay then operates to connect the selected trunk to the test set.

A similar sequence of operation can be used to step an even further forward (intermediate) selector switch by a second digit of dial pulses between the tip and ring wipers.

CONVENTIONS USED

In the drawings the relay coils are depicted by rectangular boxes in the various circuits. See for example relay coil SL in FIG. 3.

Figure 13:
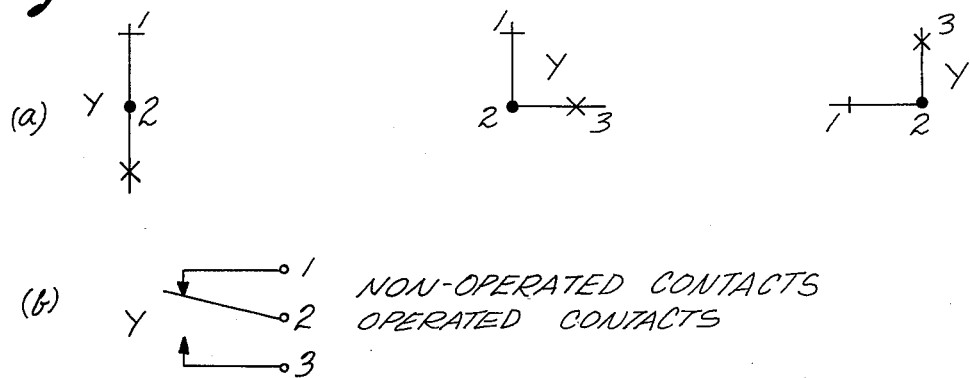
FIG. 13 is a sketch illustrating the conventions used for labeling the relay and switch contacts and calling out the normally closed and open contacts.

FIG. 13 depicts the conventions used for labeling relay contacts and for calling out the normally closed and open contacts.

Relay contacts which are closed when a relay is not energized, i.e., not operated or released, are depicted schematically by a single line and are called the "nonoperated contacts". Relay contacts which are closed when a relay is energized, i.e., operated, are depicted by an X and are called "operated contacts".

Relay contacts are identified with the corresponding relay using letter or letter symbol for the relay. For example, hypothetical contacts for a relay Y are depicted in FIG. 13. A "." between operated and nonoperated contacts represents the movable or common contact of a contact set for a relay. Although only one contact is depicted for relay X there is more than one contact set on each relay and corresponding symbols and numbering are used for all contact sets.

INDICATORS

Consider briefly the various indicators contained in the test set 2 and depicted in FIG. 1. Indicators are generally depicted at 10-26. Each of the indicators is a light emitting diode (LED) type indicator whose position in the control circuitry is depicted in FIGS. 2-7.

The SECOND DIGIT LED 10 when lit indicates that the test set has been set up to dial two digits forward in the telephone system under test and that the second digit selected is now being dialed through a forward selector switch by dial pulses on conductors T and R (see FIGS. 2 and 8) to the tip and ring leads, respectively.

Two polarity indicating LEDs STR-12 and REV-14 indicate when polarity is straight or reversed on the tip and ring leads. When STR-12 is lit, the test apparatus has closed the loop between the tip and ring leads and there is negative battery on the ring side of the telephone line. When REV is lit it indicates that the test apparatus has closed the loop between the tip and ring leads and that there is negative battery on the tip side. If neither of the STR and REV indicators is lit, the test apparatus has not closed the loop between the tip and ring leads and the tip side or the ring side, or both, are open circuit.

The TIP GND indicator 16 and the RING BATT indicator 18 flash during dialing. When an open trunk is encountered as trouble, the appropriate indicator will light showing the good conductor.

The SLV GND indicator 20 when lit indicates that the sleeve circuit in the telephone system is properly connected to ground and if it is not lit, indicates that the sleeve circuit is open. A grounded sleeve circuit, when the system operates properly, indicates that the corresponding trunk is busy.

A FALSE BUSY indicator 22 when lit indicates that the sleeve circuit is grounded but that improper circuit conditions exist between the tip and ring leads in the telephone system. Specifically, it indicates that an open loop condition exists between the tip and ring leads.

Two indicators are provided for indicating circuit conditions on the SP lead, these indicators being a BATT indicator 24 and a GND indicator 26. When the BATT indicator 24 is lit it indicates that negative battery potential exists on the SP lead. When the GND indicator 26 is lit it indicates that positive ground potential exists on the SP lead.

When neither of the BATT and GND indicators 24,26 are lit, it indicates that no potential exists on th SP lead.

SWITCHES

Switches 30 through 48 are used for controlling the various operations of the test set.

Two digits can be dialed to forward selector switches from the control switch. The digits dialed are determined by the settings of digit switches 46 and 48 respectively.

LEVEL HUNTING/NORM switch 30 when in the LEVEL HUNTING position increases test time after a second digit is dialed to a forward selector switch within which to test level hunting connectors.

A TONE/MON toggle switch 32 has two positions. In the TONE position a 2125 HZ tone is sent to the selector switch ahead. This feature forms no part of the present invention. In the NORM position the test set monitors the switches ahead for tones, announcements, etc. This feature forms no part of the present invention.

A SCAN toggle switch 34 has a FAST SCAN position which causes rapid trunk by trunk scanning. In the NORM position the switch 34 does selector and connector forward operation tests.

A TWO DIGITS/ONE DIGIT toggle switch 36 determines the number of digits to be dialed forward to forward selector switches under test. The dial pulses are applied between the tip and ring leads in the telephone switching system from the T and R conductors (FIG. 2) of the test set. The TWO DIGITS position causes two digits to be dialed for connectors and digit-absorbing selectors. The ONE DIGIT position causes one digit to be dialed forward for regular selectors.

A push button STEP switch 38 after being depressed returns to its non-actuated position. When actuated, the STEP switch 38 steps the test set off the trunk or switch in which trouble is detected and advances the control selector switch to the next idle trunk to be tested.

A FALSE BUSY RLS push button switch 40, similar to 38, when actuated resets a false busy circuit provided in the test set before the end of the test set scanning operation and provides a test for "stiff" a relay when required. An increase in current is provided to a "stiff" relay for test purposes.

An RLS push button switch 42 (similar to 38) causes the control selector switch under test to be released for other bank level redialing and to be released at the end of the control switch test on all bank levels.

TEST CORDS AND PREPARATION OF TEST SET FOR OPERATION

The test set 2 is prepared for operation as follows. As depicted in FIGS. 1 and 8 the test set 2 has a six conductor test cord receptacle 902, a two conductor battery receptacle 904 and a single conductor rotary (ROT) receptacle 906. Consider the connection of the test set to the telephone switching system under test. FIG. 8 depicts the connecting test cords and connectors schematically. A six conductor test cord 908 has a plug 907 which plugs into the receptacle 902. One end has a plug 921 containing electrical contacts 922, 924, 926 and 928. The plug 921 plugs into an idle control selector test jack of the telephone switching system under test. Contacts 926 connect to the sleeve lead of an idle control selector test jack and contacts 928 connect to ground (GND). Contacts 926 and 928 are shorted together in plug 921 and therefore connect ground (GND) to the sleeve lead in the idle control selector test jack so as to "busy out" the associated control selector switch. Contacts 922 and 924 are connected respectively to the T1 and R1 conductors 5 and 4 in the test set test jack 902 and in turn are connected by the operator into the tip and ring leads of the idle control selector test jack. Dial pulses applied at such leads by the test set 2 cause the connected control selector switch to advance vertically to the level on the control switch corresponding to the number of dial pulses.

Also included in the test cord 908 at the opposite end from plug 907 are separate tools or connectors 914, 916, 918 and 920 which are electrically connected to the T, R, S, and SP outputs of the connector 902. The T, R, S and SP connectors 914, 916, 918 and 920 are connected by the operator, respectively, to the tip, ring, sleeve, and SP leads of the control selector wiPer terminals. The SP connector 920 is only used on four wire circuits. To be explained in more detail, the signals on the tip, ring and sleeve leads are monitored by the test set 2 to determine the correct operating condition of the telephone system under test.

A two wire power cord 910 has a two conductor plug 909 which plugs into the battery jack 904 of the test set and has at its opposite end conductive clips 930 and 932 used for connecting the −48v and GND conductors in the test set 2 to the −48 volts (v) and GND outputs of the central office −48v power supply.

The single conductor cord 912 has a plug 911 for plugging into the connector 906 connected to the ROT (standing for rotary) conductor in the test set, and the opposite end of the cord 912 has a clip 934 for connecting the ROT conductor to the stationary spring of the cut through relay corresponding to the control selector switch under test.

FIG. 9 indicates schematically the cut through relay and its connection to the selector rotary magnet. An open connection on the ROT conductor followed by a connection to GND will cause the rotary magnet to be energized, and thereby advance the control selector switch to which the test set is connected, to the next rotary position or trunk. In addition, a strip of bond paper is inserted between the break contacts of the cut through relay which connect the sleeve input to the rotary magnet circuit (see FIG. 9). Additionally, an insulated blocking tools is used to block the selector cut through relay in the nonoperative position.

Referring to FIG. 1 the digit selector switches 46 and/or 48 are now set to the desired digit or digits to be dialed (via conductors T and R and connectors 914 and 916) into the switch ahead in the telephone system. The TWO DIGITS/ONE DIGIT switch is set to one or two digits depending on whether one digit or two digits are to be dialed into the switch ahead.

If a first link testing only is desired the SCAN switch 34 is placed in the FAST position. This confines testing to the verification of continuity and polarity of the tip, ring and sleeve leads and to a nominal operate test of the A and B relays of the switch ahead and is a very rapid method of verifying the first link.

If the first link is to be tested and only a test is to be performed on the lead integrity polarity and all operational features, including cut through of the switch choices or switches ahead, the SCAN switch 34 is placed in the normal (NORM) position. This involves a longer test time per test as one or two digits are dialed forward by the test set.

Assume that the TONE/MON switch 32 is set to the NORM position, the LEVEL HUNTING/NORM switch is set to the NORM position.

A dial digit is selected by using dial 28 to access the bank level on the control selector switch which is to be tested. This will cause a series of open and close connections to be applied between the T1 and R1 conductors (see FIGS. 2 and 8) and thereby causes the control selector switch to advance to the corresponding level. The same control selector switch then automatically rotates to an idle position or trunk. Before the dial pulses are applied on the T and R conductors, the test set applies what is termed an "A RELAY SEIZURE VALUE" of current between the T and R conductors (see FIGS. 2 and 8). The A RELAY SEIZURE VALUE is applied for approximately 250 milliseconds prior to the start of the dial pulses.

The test set then proceeds with the operation which will be described in more detail hereinafter.

Upon the successful completion of the test on each trunk the ROT conductor (see FIGS. 2 and 8) is connected to ground thereby advancing the control selector switch to the next idle rotary position or trunk in the same level.

After the last trunk on the selected level of the control selector switch has been tested, the RLS push button switch is actuated and causes the T1 and R1 conductors to be open circuit which in turn causes the control selector switch under test to be released, ready for the dialing and selection of a different level of the control selector switch.

The dial 28 is then used to dial a new level. Alternatively, another control selector switch can be tested by connecting the connectors 914-928 and 934 thereto in the manner described hereinabove.

The foregoing steps are repeated for each desired control selector switch.

CIRCUIT DETAILS

SP LEAD MONITOR CIRCUIT 202-FIG. 2

The SP lead monitor circuit 202 of FIG. 2 is only used when scanning four wire trunks. Considering the SP lead monitor circuit 202 in more detail, if battery voltage or ground voltage is encountered on the SP lead while the telephone system is scanning, the appropriate one of indicators 24 and 26 will be lit, indicating the problem, and an optical coupler 212 will be switched on. To be explained in more detail, the turn-on of the optical coupler 212 will cause a P1 relay (FIG. 5) to operate which in turn stops the rotary scanning action created in a selector switch by a rotary step circuit 208.

Figure 5:
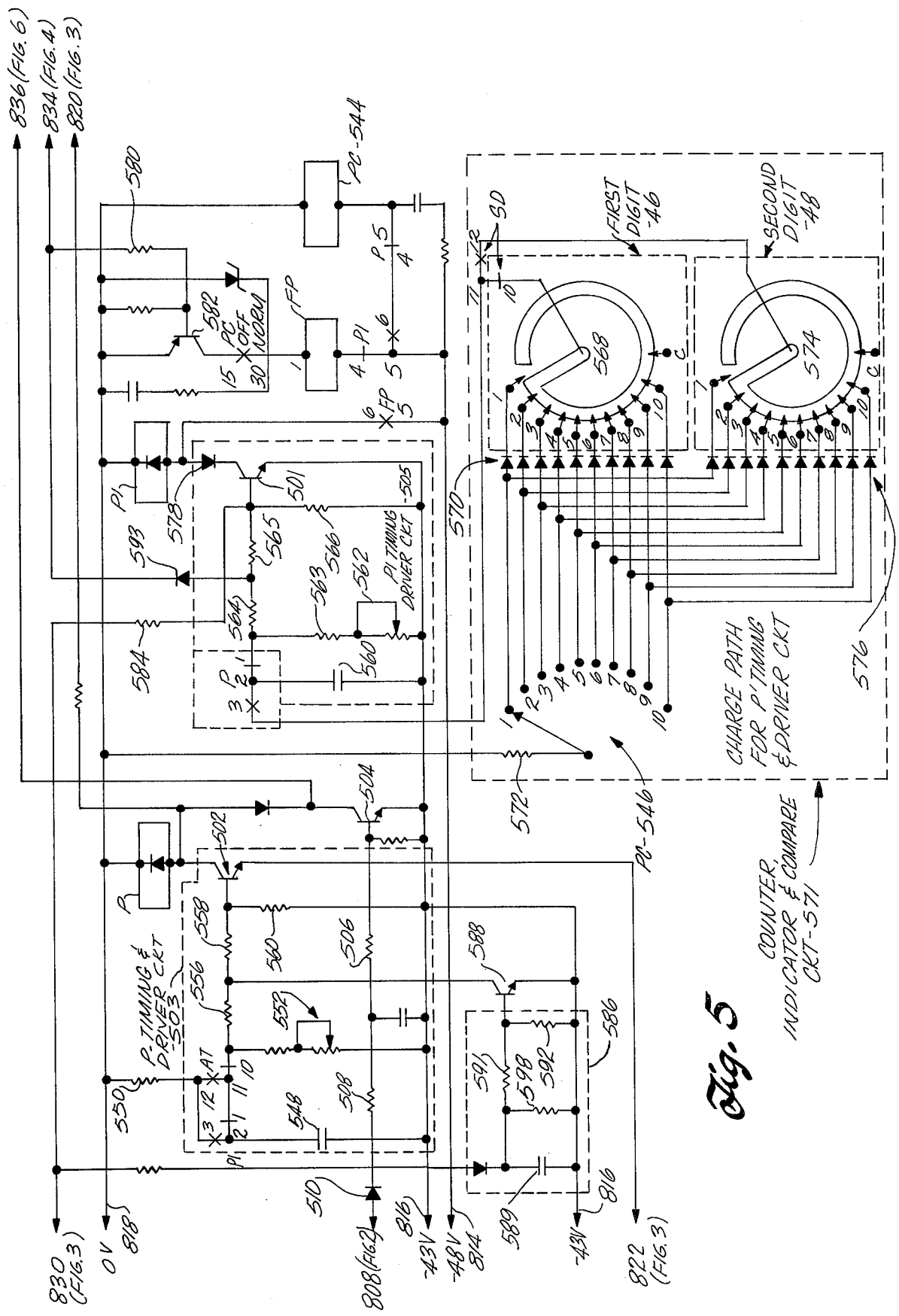

When ground appears on the SP lead during scanning, a circuit is established between the SP conductor (contact 6 in test jack 902 and the −48v conductor) through the following circuit elements: diode 214, light emitting diode portion 212b of optical coupler 212, diode 216, GND indicator LED 26, resistor 222, zener diode 224, and diode 226. As a result the GND LED indicator 26 is lit. Additionally, the light emitting diode 212b energizes the optical sensitive transistor 212a portion of the optical coupler 212, causing it to switch into conduction and thereby connect conductor 802 to 0 volts potential through the operated contacts 3-2 of relay SL. To be explained in more detail, the connection of conductor 802 to ground causes ground to be applied through an OR gate (FIG. 3) to a conductor 830 which in turn switches on a driving transistor 40 which in turn energizes the coil of a P1 relay (FIG. 5). The zener diodes 230 and 224 have a break-down voltage which is slightly less than the −48v battery provided in the central office power supply.

If negative battery voltage appears on the SP conductor a circuit path is established from the SP conductor to 0 volts potential through the following circuit path:

diode 218, light emitting diode 212b, diode 220, BATT LED indicator 24, resistor 228, zener diode 230, diode 232. As a result, the BATT indicator LED 24 is energized in the optical coupler 212 is again switched on, causing the P1 relay to be energized in the manner discussed above.

With reference to the truth table of FIG. 10 it will be noted that the SL relay is operated and hence the operated contacts 2-3 close, enabling the optical coupler 212 to cause the P1 relay to be energized and thus operated, only after the scanning operation commences.

DIAL CIRCUIT 204 - FIG. 1

Dial circuit 204 includes simply pulsing contacts 28a of the rotary dial 28 and the normally closed contacts 1-2 of the RLS switch 42 connected in series across the T1 and R1 conductors which in turn are connected across the idle control selector switch test jack which will cause level to be selected by the control selector switch.

Additionally, a series connected circuit consisting of a capacitor 234 and a resistor 236 are connected across the T1, R1 conductors to provide contact protection for the dial contacts 28a and the contact of the RLS switch 42 to prolong contact life.

VOLTAGE SENSITIVE LOOP CLOSING CIRCUIT 206 - FIG. 1

The voltage sensitive loop closing circuit 206 is across the T and R conductors which in turn are connected to the tip and ring leads of the trunk under test through the wipers and banks of the control selector switch under test.

Several control operations and circuit conditions are created across the T and R conductors by circuit 206.

The voltage sensitive loop closing circuit 206 includes a margining circuit which in effect provides a margin test for the A relay in the forward selector switch or forward connector switch associated with the trunk under test. When the switching system under test is operating properly, a + to − potential is expected between the T and R conductors from the tip and ring leads of the switch under test. When this occurs the voltage sensitive loop closing circuit 206 switches to a low impedance condition. However, the margining circuit limits the current, in the low impedance condition, to 16.5 milliamps of current flow between the T and R conductors which is a margin test for the A relay which must be operated under the low impedance condition.

The voltage sensing circuit 206 includes a zener diode 240 having a break-down (turn on) voltage of about 40 volts. When the zener diode is switched into conduction, the silicon control rectifier 238 is also switched on, thereby closing the loop, causing the above mentioned low impedance condition between the T and R conductors. The sensing path for the potential between the T and R conductors, including the zener diode 240, is as follows, going from the R to the T conductors: diode 242, the nonoperated contacts 10-11 of the P relay, resistor 244, resistor 246, diode 248, resistor 250, diode 240, diode 251, conductor 804, resistor 252 (FIG. 3), conductor 806, normally closed contacts 8-7 of the P relay.

If the polarity of the potential between the T and R conductors is reversed, i.e., − to + from T to R conductors, a reverse current path is established through the voltage sensitive loop closing circuit through the REV LED indicator 14 as follows: REV LED indicator 14, the non operated contacts 10-11 of the P relay, resistors 244, 246, diode 254, zener diode 240, resistor 250, diode 256, conductor 804, resistor 252, conductor 806, and the non operated contacts 7-8 of the P relay. As a result, the REV LED is lit, indicating reverse potential between the T and R conductors.

When the A relay does not operate which is indicated indirectly by the absence of the SLV GND light actuation of the FB RLS switch 40 allows the resistor 244 in the loop to be shorted out thereby increasing the A relay margin current to 22.5 milliamps. In this way the operation of "stiff" or marginal A relays can be checked for operation.

Figure 3:
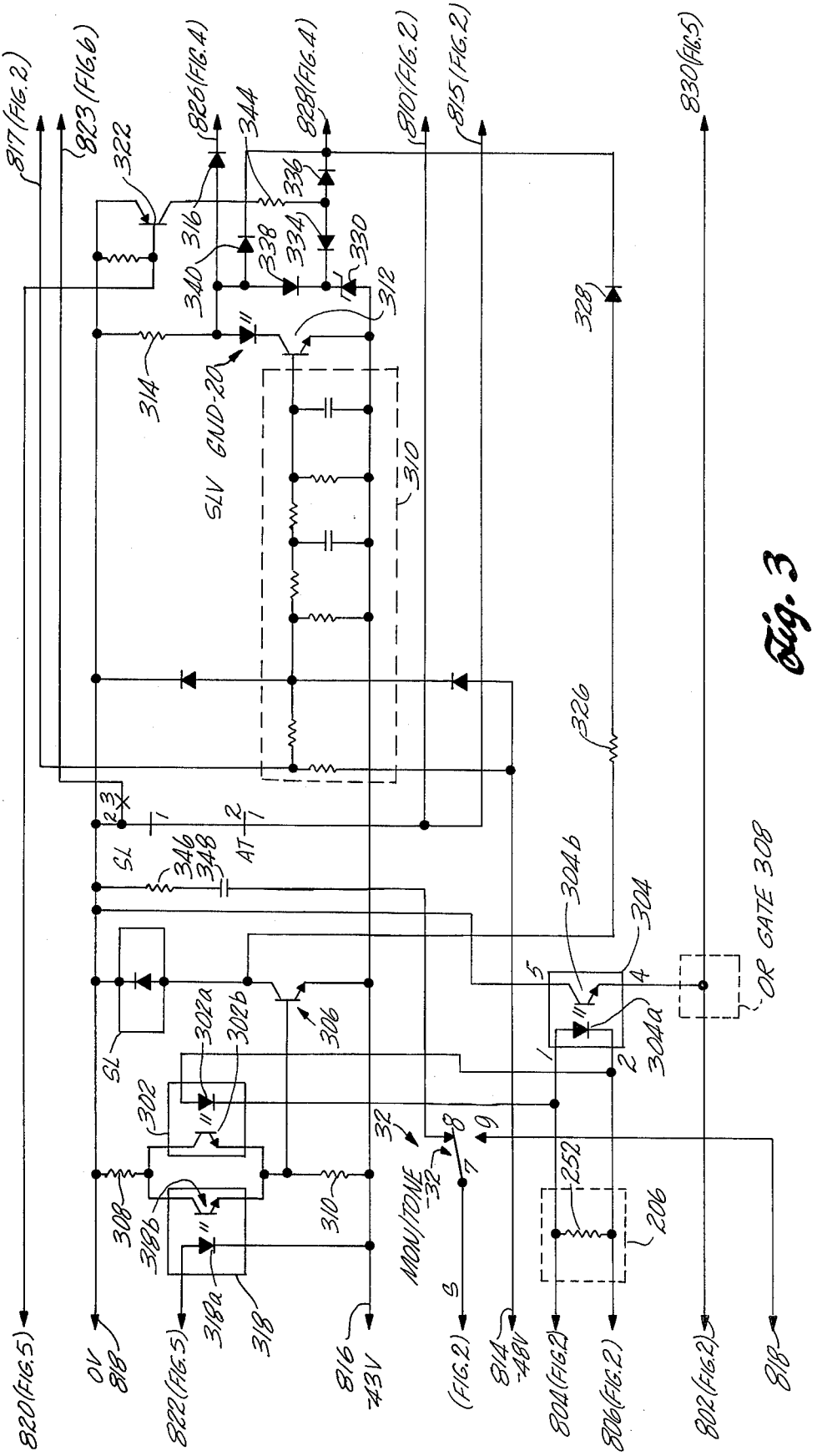

Also included in the closed loop between the T and R conductors and across the conductors 804 and 806 are light emitting diodes 302a and 304a of optical couplers 302 and 304 (see FIG. 3). When the loop is straight, i.e., the potential is + to − from T to R conductors, current flows through light emitting diode 302a thereby turning on optical coupler 302. Turn on of the optical coupler 302 causes drive transistor 306 to be turned on which in turn passes current through the coil of the SL relay causing it to operate and hence close its operated contacts.

When the loop through the voltage sensitive loop closing circuit 206 is reversed, i.e., a − to + potential from T and R conductors, current flows through light emitting diode 304a, turning on optical coupler 304. The turn on of optical coupler 304 causes 0 volts to be applied from conductor 818 to conductor 830 through OR gate 308 which in turn causes P1 relay drive transistor 402 (FIG. 5) to turn on which in turn passes current through the coil of the P1 relay causing it to be operated and close its non operated contacts. To be explained in more detail, operation of the P1 relay opens the non operated contacts 7-8 of the P1 relay shown connected to conductor 808 in FIG. 2, thus preventing further rotary pulses from being applied to the ROT conductor, thereby preventing the control selector switch from stepping to the next trunk and thereby terminating the scanning operation.

Dial pulses to the forward switches in the telephone system are applied across the T and R conductors by the non operated contacts 10-11 and 7-8 of the P relay contained in the voltage sensitive loop closing circuit 206. These contacts and the associated circuitry form a pulse generating circuit for the forward switches. With reference to the truth diagram of FIG. 10, the P relay operates, thereby opening the non operated contacts 10-11 and 7-8 after the SL and S relays have operated and after the AT timer and hence the AT relay have timed out. The operation and control of operation of the P relay will be discussed in more detail in connection with the pulse generator and digit selector circuit of FIG. 5.

However, with respect to the voltage sensitive loop closing circuit 206 it will be noted that a circuit is provided across the T and R conductors through the non operated contacts 7-8 of the AT relay, a resistor 256, and the operated contacts 11-12 of the P1 relay. When the P1 relay is operated and the AT relay has released (see FIG. 10), the resistor 256 is connected across the loop in parallel with the rest of the closed loop resistance, thereby raising the current between the T and R conductors to approximately 28 milliamps. Significantly, this increased current provides a reoperate current for the A relays in the switches under test to be equivalent to the normal 1400 ohm loop pulsing requirement of telephone systems. However, this only occurs when digits greater than 1 are set into the digit selector (see FIG. 1) because the P1 relay does not operate to dial the digit 1.

ROTARY STEP CIRCUIT 208 - FIG. 2

Consider now the rotary step circuit 208. Five different conditions can exist on the rotary step circuit 208. First it should be noted that central office ground, GND, when applied on the ROT conductor causes the control selector switch to step. This ground signal always comes from the sleeve lead of the trunk being tested and hence appears on the S conductor shown in FIG. 2. Contacts 1-2 and 4-5 of the MON/TONE switch 32 (when in the MON position) and the series connected diode 258 and resistor 260 are common to all paths required to connect the S conductor to the ROT conductor. With the MON/TONE switch in the TONE position, contacts 2-3 of the MON/TONE switch connect the S conductor to ground and contacts 1-2 of the MON/TONE switch are open, preventing the ROT conductor from applying ground to the control selector switch.

Consider now the five different conditions which may exist in the rotary step circuit 208:

1. BUSY TRUNK — when a BUSY TRUNK is encountered for a particular rotary position of the control switch, the sleeve lead of the telephone system and hence the S conductor (FIG. 2) receive ground potential. The AT relay is operated and the SL and P1 relays are released. As a result, ground potential is connected from the S conductor to the ROT conductor via the operated contacts 5-6 of the AT relay, the non operated contacts 4-5 of the SL relay, and the non operated contacts 7-8 of the P1 relay. This causes the control selector switch to rotate off from the busy trunk preventing dial pulses from being applied to the busy trunk.

2. FAST SCAN — when a fast scan mode of operation exists and the SCAN switch 34 is in the FAST position, the SL relay is operated and the P1 relay is released. As a result, a path is completed through the contacts 1-2 of the SCAN switch 34, the operated contacts 5-6 of the SL relay, and the nonoperated contacts 7-8 of the P1 relay. The only relay that must operate under these conditions is the SL relay.

3. SUCCESSFUL TEST — when a successful test has been performed on a trunk after dialing two digits forward, the following relays are operated: R, SD, and SL, and the P1 relay is released. Therefore a path is completed between the ground potential on the S conductor and the ROT conductor via the operated contacts 5-6 of the R relay, operated contacts 3-2 of the SD relay, operated contacts 6-5 of the SL relay, and the nonoperated contacts 7-8 of the P1 relay. The connection between the S and ROT conductors and hence the rotary pulse is initiated when the R relay operates as it is the last relay in the path to operate. The SD relay is operated when a second digit is dialed forward in the switching system and therefore the path between the S and ROT conductors is not completed until the second digit is dialed forward.

4. SUCCESSFUL TEST — ONE DIGIT — when a successful test has been performed after dialing only one digit forward, the path completed is similar to that for 3 above. However, the TWO DIGITS/ONE DIGIT switch 36 is in the ONE DIGIT condition causing contacts 1-3 to be closed, thereby shorting out the operated contacts 3-2 of the SD relay. Therefore the operation of the SD relay is not required to complete the path between the S and ROT conductors and hence provide a pulse to the rotary circuit. Under these conditions the rotary pulse and hence the rotary step take place when the R relay operated after one digit is dialed.

5. REVERSED LOOP POLARITY — Reversed loop polarity exists when the potential between the T and R conductors is − to +, respectively. When this occurs the P1 relay is operated and hence the nonoperated contacts 7-8 of the P1 relay remain open, preventing the ground connection between the S and ROT conductors from being established by the rotary step circuit 208. As a result, any of the prior mentioned paths may be set up with the exception of closure of the nonoperated contacts 7-8 of the P1 relay.

If it is desired to manually cause the test set to step to the next trunk, the step switch 38 is depressed causing contacts 3-4 thereof to close, thereby providing a short around the nonoperated contacts 7-8 of the P1 relay.

The voltage regulator 210 is a conventional circuit and utilizes a series pass power transistor circuit which is controlled by a differential comparator. The regulator utilizes the voltage from the central office power supply applied to jack 904 and applies a regulated −43v on conductor 816 with respect to conductor 818.

LOOP/SLEEVE SENSING AND TIMER CONTROL - FIG. 3

Should voltage be reversed, and − to + potential exists between T and R conductors, current flows through the light emitting diode 304a, causing light sensitive transistor 304b of the optical coupler 304 to be switched into conduction and thereby hold the conductor 830 at approximately the ground voltage existing on the OV conductor 818 which in turn causes the P1 relay drive transistor 501 in the pulse generator and digit selector circuit of FIG. 5 to be switched on which in turn operates the P1 relay, stopping the scanning operation by opening its nonoperated contacts 7-8.

As discussed above, the optical couplers 302 and 304 have a resistor 252 between conductors 804 and 806 and provide certain control action. Specifically, when the loop is straight, i.e., + to − potential exists from T to R conductors, current flows through the light emitting diode 302a, energizing the light sensitive transistor 302b of the optical coupler 302, causing it to switch into conduction and thereby allow current to flow between the 0 volt conductor 818 and the −43v conductor 816 via resistors 308 and 310. The voltage generated across resistor 310 switches the transistor 306 into conduction, causing current to flow through the coil of the SL relay indicated schematically in FIG. 3 between the 0 volt and −43 volt conductors. As a result, the SL relay is operated. This is one of the initial operations in the test set.

As discussed, the telephone switching system under test operates the A and B relays (see FIG. 12) of the trunk under test. Operation of the B relay connects ground potential (0 volts) to the sleeve lead of the trunk and hence to the S conductor of the test set. The contacts 9-7 of the step switch and contacts 1-2 of the MON/TONE switch 32 connect the S conductor through the nonoperated contacts 5-4 of the R relay (FIG. 3b) to the input of a low pass filter circuit 310 over a conductor 815. 0 volts is applied to the input of a low pass filter circuit 310 which in turn is applied to the base electrode of a transistor 312 causing it to turn on after about a 5 millisecond delay. As a result, transistor 312 does not turn on responsive to transient voltages on the S conductor.

In operation when the sleeve lead S is grounded, transistor 312 is switched into conduction and a path is completed between the 0 volt conductor 818 and the −43v conductor 816 via resistor 314 and the SLV GND LED 20 causing the LED to light, indicating a good grounded sleeve condition and causing the anode of diodes 316 and 340 to drop, substantially, to the −43 volt potential on conductor 816. Additionally, the junction between the SLV GND LED 20 and the resistor 314 is connected through diode 316 to output conductor 826. The drop in potential at the anode of 316 and 340 when transistor 312 switches into conduction reverse biases diodes 316 and 340 to conductors 826 and 828 which in turn causes the AT and T timers (FIG. 4) to start their timing operations as will be explained in more detail.

A P relay driver transistor 502 in the pulse generator and digit selector circuit of FIG. 5 has its collector connected through the coil of the P relay to the 0 volt conductor 818 and its emitter electrode serially connected by conductor 822 through the light emitting diode 318a to the −43v conductor 816. Each time transistor 502 operates the P relay, the light emitting diode 318a receives the current from the transistor 502 and switches the optical coupler 318 into conduction. This in turn holds transistor 306 on, which operates the SL relay. A dial pulse is represented by an open circuit condition between the T and R conductors created by the opening of the nonoperated contacts 10-11 and 7-8 of the P relay when the P relay is operated. Therefore each time the P relay is operated and hence a dial pulse is applied across the T and R conductors to the trunk under test, the SL relay initial operate path is opened. Operation of the SL relay closes its operated contacts 5-6 before the open circuit phase of the dial pulse is formed between the T and R conductors and must remain operated for the dialing to continue. Thus the SL relay is initially operated and continues to be operated so long as dial pulses are formed by the P relay.

Transistor 322 has its base electrode connected to conductor 820 which in turn is connected to the collector electrode of transistor 502 in the pulse generator and digit selector circuit of FIG. 5. As a result, transistor 322 follows the operation of the P relay which is controlled by the transistors 502 and 504. Each time the P relay operates, transistor 322 turns on. Thus, each time the rotary dial pulse is generated, and hence transistor 502 is turned on which turns on transistor 322 (FIG. 3), it causes essentially ground potential to be applied at the output conductor 828 (FIG. 3) via diode 336. The essentially ground potential applied at conductor 828 is applied to the input of the timer circuits of FIG. 4 which in turn acts to continuously reset the T timer so that its time-out interval only commences after the dialing between the T and R conductors is complete for each digit. If the trunk circuit loop between the T and R conductors should open for reasons other than dialing, transistor 306 will turn off. It should be noted that while transistor 306 is in conduction due to dial pulses or loop closure (transistors 318b or 302b turned on), essentially a −43v signal is applied through resistor 326 and diode 328 to conductor 828 which in turn is connected to the input of the T timer 410 and controls the conduction of the control transistor 402 for the T relay. To be explained in more detail, when transistor 306 (FIG. 3) switches into nonconduction it allows the potential on conductor 828 to rise, which in turn prevents the T timer 504 from timing-out and thereby maintains the T relay operated.

The base electrode of transistor 504 is in series connection with resistors 506 and 508 and diode 510 to conductor 808 from the rotary step circuit 208. Thus each time the rotary step pulse is applied to conductor 808 or a busy (grounded) sleeve is encountered, transistor 504 is turned on which in turn operates the P relay. This action causes tip and ring conductors to be open to the test set for all but false busy tests while rotary step functions are taking place.

Consider control for the AT timer 408. The nonoperated contacts 4-5 are broken when the R relay operates. Up to this time, ground potential is applied via the S conductor from the sleeve lead to the base of transistor 312, maintaining it in conduction. Thus when the R relay is operated, opening the operated contacts 4-5, the transistor 312, after the delay provided by circuit 310, switches into nonconduction, causing the signals at conductors 826 and 828 to rise, thereby recharging the capacitors 412 and 406 in the AT timer 408 and T timer 410, respectively, to approximately 33v.

TIMER CIRCUITS - FIG. 4

Figure 4:
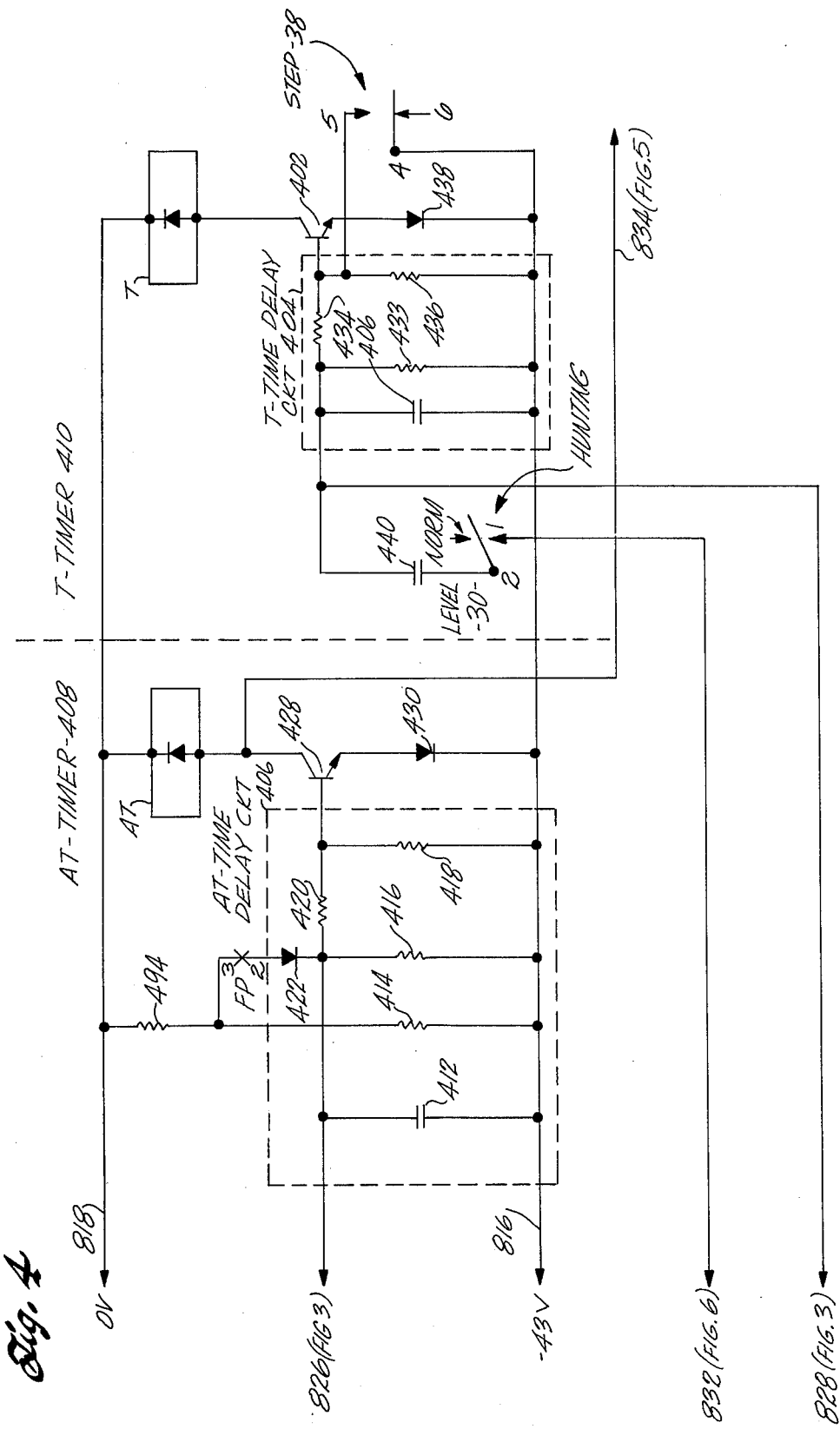

FIG. 4 shows the AT timer circuit 408 and the T timer circuit 410. The inputs for controlling these timers include the conductors 826, 828 and 832, shown along the left hand side of the Figure. The AT timer allows 200-300 milliseconds of A relay seizure (A) relay being the relay in the forward control switch under test) prior to the start of the dial pulses between the T and R conductors. This is to ensure that the B relay in the same control switch of the trunk being tested has been energized by the A relay long enough to provide its slow release feature. It is important that the B relay of the control selector switch or connector switch in the trunk under test not release during dialing.

The T timer 410 provides approximately 700 milliseconds of test time after the dialing is complete (i.e., the required number of digits have been dialed through the T and R conductors). The T timer provides the same delay time as interdigital and test time between digits when dialing two digits.

Consider the AT timer in more detail. The AT timer 408 and also the T timer 410 and the corresponding relays are normally operated. The AT timer 408 includes the AT time delay circuit 406 composed of a capacitor 412 and resistors 414, 416, 418, 420 timer circuit. The emittercollector circuit of transistor 428 for the AT relay is connected in series circuit with the coil of the relay AT between the 0 volt conductor 818 and the −43v conductor 816 through a diode 430.

The T timer circuit 410 includes the T-time delay circuit 404. The T-time delay circuit 404 includes a capacitor 406 and resistors 433, 434 and 436 in a timing circuit.

As explained above, when no ground is on the sleeve and therefore not on the S conductor, transistor 312 is not conducting and the anodes of diodes 316 and 340 are at about +33 volts relative to the −43v conductor 816. As a result the diodes 316 and 340 are forward biased and charge the capacitors 412 and 406 via conductors 826 and 828. The charged capacitors 412 and 406 in turn maintain the transistors 428 and 402 conductive and hence the relays AT and T operated.

As explained with respect to FIG. 3 when the sleeve (and S conductor) are grounded the transistor 312 is switched into conduction and the diodes 316 and 340 are reverse biased opening conductors 826 and 828 to the circuit of FIG. 4. As a result, capacitors 412 and 406 discharge through the timing resistors within the delay circuits, providing the 200-300 millisecond time delay before transistor 428 is switched into nonconduction, thereby releasing the AT relay and providing the 700 millisecond time delay before transistor 402 is switched into nonconduction and the T relay is released.

Figure 6:
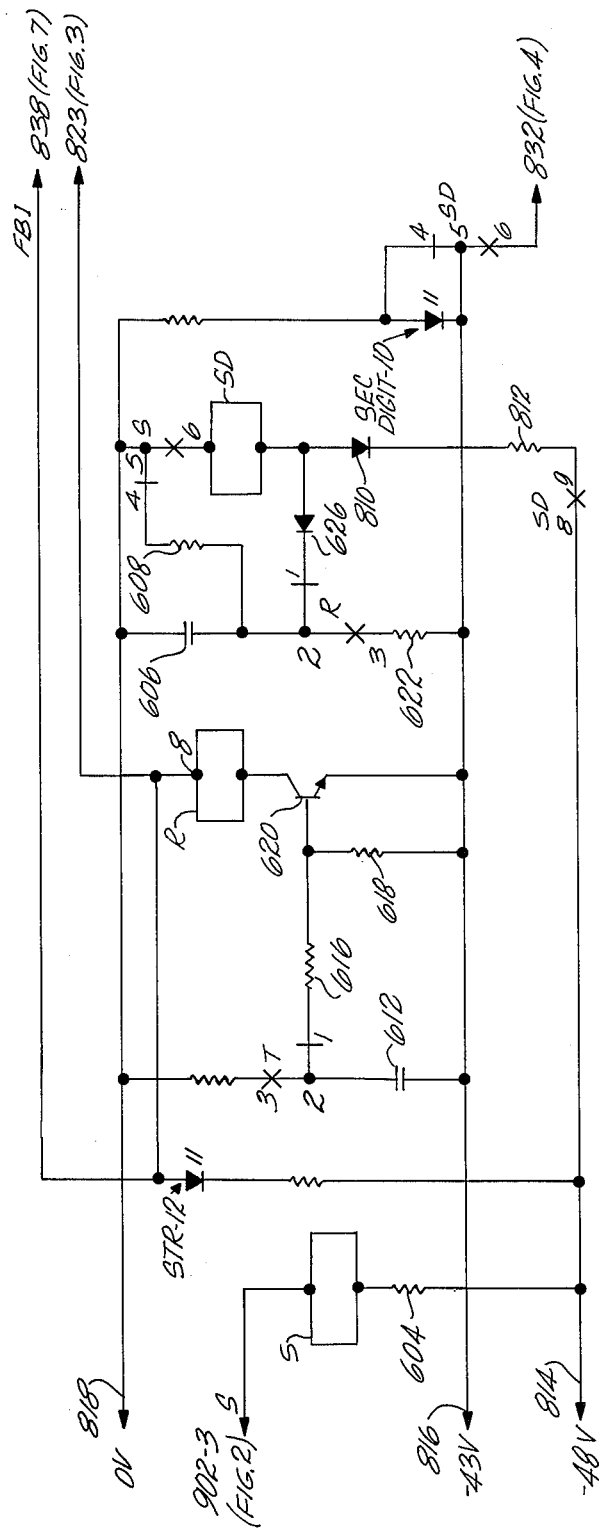
Figure 11:
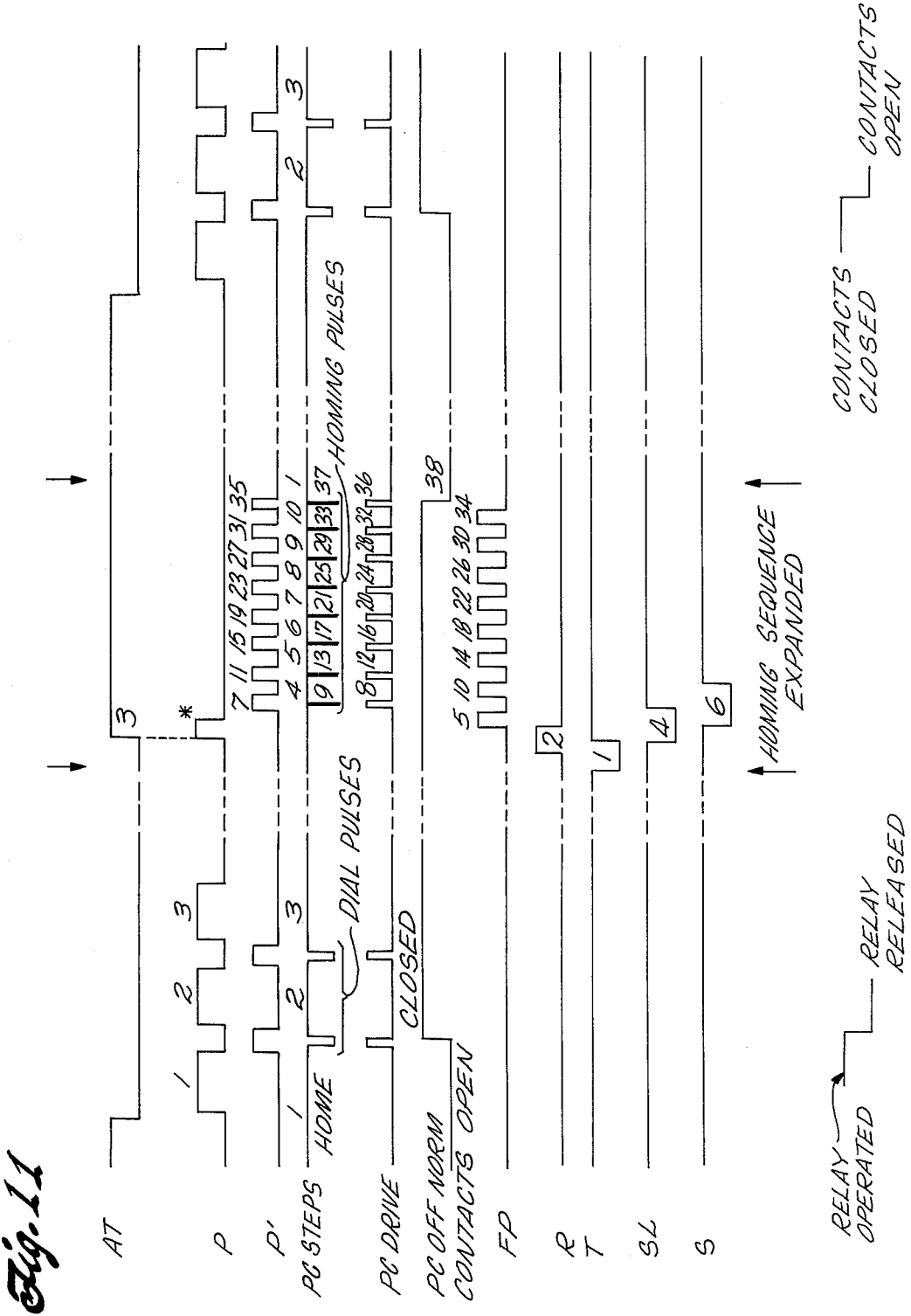

If the LEVEL switch −30 is set to the HUNTING position its contacts 2-1 are closed, connecting an additional capacitor 440 in parallel with the timing capacitor 406 to thereby extend the T time delay interval after the second digit by approximately 50%. Completion of connection of the capacitor 440 is effected by the operated contacts of the SD relay which are depicted in FIG. 6. In this connection the SD relay is only operated when a second digit is to be dialed across the T - R conductors.

As mentioned above, the T timer 410 initiates the action which causes the control selector switch to take a rotary step to the next trunk (after completion of a test) and permits a second digit to be dialed when two digits are required.

If trouble is encountered during any portion of the test cycle, the T timer is disabled. With the T timer disabled, the control selector switch under test remains connected to the trunk with the trouble condition. The operator, however, may override this action by operating the step switch 38 which causes the test set to generate one rotary step pulse in the following manner: the sleeve input to the rotary step circuit 208 is removed when contact 7 of the STEP switch 38 transfers (due to actuation of switch 38) from contact 9 to contact 8. STEP switch contacts 7 and 8 then provide a short or bypass from the input of the rotary step circuit to its output conductor 808. Ground (0 volts) is supplied through contacts 1 and 2 of the STEP switch to make contact 6 of the R relay and the path from contact 6 of the R relay through contacts 1 and 3 of STEP switch to contact 3 of the SD relay is opened. The last set of contacts, 5 and 6, on the STEP switch are used to place a short across the emitter-base junction of transistor 402 in the T timer 410 causing transistor 402 to switch to the nonconducting state which in turn releases the T relay.

The T relay in releasing causes the R relay to operate and release. The momentary operation causes a rotary step ground pulse to be applied to the ROT conductor and jack 906 through the following contacts: 1 and 2 of STEP switch, 5 and 6 of the R relay, 7 and 8 of the STEP switch, resistor 260 and diode 258 of the STEP circuit 208, and contacts 4 and 5 of the MON/TONE switch.

PULSE GENERATOR AND DIGIT SELECTOR CIRCUIT - FIG. 5.

FIG 5 contains the P, P1 and FP relays. Significantly, two relay flip flop or bistable circuits are formed, one by the P and P1 relays (P-P1 flip flop) and the other by the P1 and FP relays (P1-FP flip flop). The two flip flops share the P1 relay.

A counter, indicator and compare circuit 571 is provided for control of the P-P1 flip flop. Specifically, the counter, indicator and compare circuit 571 is in a charge path to a capacitor 560 in the P1 timing driver circuit 505. Unless the charge path through the counter, indicator and compare circuit 571 is complete, the P1 timing driver circuit 505 will not operate the P1 relay. The counter, indicator and compare circuit 571 includes a 10 position PC stepper. The control coil for the PC stepper is depicted at 544. The PC stepper 546 has a wiper and 10 mating contacts, the latter numbered 1-10. The digit switches 46 and 48 are rotary switches, having rotary wiper contacts 568 and 574, respectively, and each also has 10 contacts numbered 1-10. Contact Nos. 1-10 of the FIRST DIGIT switch 46 are each connected through a separate diode 570 to the correspondingly numbered contact of the PC stepper. Similarly, each of the contacts 1-10 of the SECOND DIGIT switch 48 is connected through a separate diode 576 to the correspondingly numbered contact of the PC stepper. The diodes 570 and 576 isolate the FIRST and SECOND DIGIT switches 46 and 48 from each other. The wipers 568 and 574 are arranged so that they short together all but the selected digit contact. Thus, for example, when the rotary contact 568 is set for a digit 5, contacts 1 through 4 and contacts 6 through 10 are shorted together via the rotary contact 568.

To be explained in more detail, when more than the digit one is to be dialed, the digit switch 46 and/or the digit switch 48 is set to 2 or greater. While the dial pulses are being generated, each time the P1 flip flop is operated (in a 1 state), the PC stepper advances its wiper to the next contact. The charge path to enable operation of the P1 relay is completed through the rotary wiper 568 or 574 and all but one of the contacts of the digit switch 46 or 48 and through the connected contact and wiper 546 of the PC stepper. When the wiper of the PC stepper reaches a contact which is the setting of the digit switch 46 or 48, the charge path through the counter, indicator and compare circuit 571 to the P1 timing and driver circuit 505 is open, and the P1 relay no longer operates. In this manner the PC stepper forms a counter which keeps track of the number of dial pulses, for dial pulses greater than 1, generated by the P relay, and prevents dial pulses greater than that set on the digit switches from being generated.

The PC stepper is characterized in that its wiper is initially on contact number 1 and advances from one contact to the next sequentially responsive to the flow of current through the control coil 544. The wiper of the PC stepper advances from one contact to the next, from contact 1 to contact numbered 10, and back to contact number 1.

Consider now the P-P1 and P1-FP flip flops. During the operation of the P-P1 flip flop, the following contacts of the P and P1 relays perform the indicated functions: the P relay, nonoperated contacts 10-11 and 7-8, open and close the loop between the T and R conductors (FIG. 2) therby generating the dial pulses therebetween. The P1 relay operated contacts 2-3 and the nonoperated contacts 1-2 cause the continued operation of the P relay to form dial pulses when more than one digit is being dialed via T - R conductors, and P1 contacts 5-6 cause the PC stepper to count the dial pulses (of more than one). Significantly the first dial pulse, and in case of one dial pulse the only dial pulse, formed between the T and R conductors is generated by the P relay responsive only to the time-out of the AT timer. The PC stepper plays no part in this operation.

The action of the P-P1 flip flop is depicted in FIG. 10 at P and P1 where it is indicated that P is first operated, then released, and the P1 relay is then operated. Each time the P relay is operated and released, its nonoperated contacts 10-11 and 7-8 open and then close, thereby generating a dial pulse between the conductors T and R (see FIG. 2).

As previously mentioned when more than one dial pulse is formed, the PC stepper keeps track of the number of dial pulses generated by the P relay.

In general the operation of the P1 relay of the P-P1 flip flop depends on the operation release of the P relay, and the operation of the P relay depends on the operation release of the P1 relay. Significantly, however, the initial operation of the P relay and hence the first dial pulse between the T - R conductors is initiated only by the time-out of the AT relay.

The P-FP flip flop and in particular the FP relay generates homing pulses which cause the PC stepper to be stepped back to its home position with the wiper in contact with contact No. 1. For example, if the wiper of the PC stepper is at contact No. 2, nine pulses applied to the PC coil 544 step the stepper to contact No. 1 (see example in FIG. 10). The P1-FP flip flop generates homing pulses if the wiper of the PC stepper is off normal, i.e., other than on contact 1.

The P-P1 flip flop uses transistor timing drivers which have independently adjustable time constants. This provides independent adjustment of the make and break time intervals of the dial pulses. The P1-FP flip flop does not make use of the same transistor driver associated with the P1 relay and therefore the P1-FP flip flop operates at a higher speed than the P-P1 flip flop and is controlled mainly by the operate time and the release times of the relays when the collapsing field of the coil is shunted by a diode.

With the general background of the P-P1 and P1-FP flip flops in mind, consider specifically the operation of the P-P1 flip flop as it generates the dial pulses.

The AT relay is initially operated (as indicated in FIG. 10). As a result the operated contacts 12-11 and the nonoperated contacts 10-11 of the AT relay depicted in FIG. 5 are closed and opened, respectively. The P1 relay is not operated and accordingly the nonoperated contacts 2-1 of the P1 relay are closed. As a result, capacitor 548 in P timing and driver circuit 503 is connected between 0 volt conductor 818 and the −43v conductor 816 through a resistor 550, fully charging the capacitor 548 prior to the release of the AT relay.

When the AT timer times-out, the AT relay releases, causing its operated contacts 12-11 to open and its nonoperated contacts 10-11 to close, thereby connecting the fully charged capacitor 548 to the timing resistor and bias circuit for the P relay driver transistor 502. The timing resistor and bias circuit for the driver transistor 502 includes resistors 552–560, resistor 552 being an adjustable resistor for adjusting the delay time. Opening of the operated contacts 12-11 of the AT relay releases the charge circuit from the capacitor 548, and closure of the nonoperated contacts 10-11 of the AT relay couples the charged capacitor 548 through the timing resistor and bias circuit to the base electrode of the transistor 502, tending to bias it into conduction. The emitter electrode of transistor 502 is serially connected through the light emitting diode 318a of the optical coupler 318 to the −43v conductor. As a result, the drive transistor 502 is switched into conduction, causing current to flow through the coil of the P relay from the 0 volt conductor to the −43v conductor, operating the P relay. The P relay driving transistor 502 and the P relay therefore remain in conduction for the time interval determined by the adjustable time constant of the P-timing and driver circuit 503.

The P1-timing and driver circuit 505 contains the P1 relay driver transistor 501. A capacitor-resistor time delay circuit includes capacitor 560 and bias and timing resistors 562–566. Time delay is adjusted by the adjustable resistor 562. The output of the capacitor-resistor time delay circuit is connected to the base electrode of P1 relay drive transistor 501. The charge path for the capacitor 560 in the P1 timing circuit 506 is controlled by the pulse counter, indicator and compare circuit 571 as described above.

Continuing now with the operation of the P-P1 flip flop, the operated contacts 3-2 of the P relay, prior to operation of the P relay, are open and therefore the capacitor 560 is discharged. Operation of the P relay causes its operated contacts 3-2 to close and the nonoperated contacts 1-2 to open. As a result a charging path is established to the capacitor 560 via circuit 571. Specifically, the charging path is through the nonoperated contacts 10-11 of the SD relay, the rotary wiper 568 and all but one of contacts 1-10 of the FIRST DIGIT switch 46, one of diodes 570, the connected wiper and contact of switch 546, and resistor 572. A similar charging path is established when the second digit is being dialed between the T and R contacts and the SD relay is in the operated state, causing its operated contacts 11-12 to be closed, causing a charge path through the rotary contact 574 and contacts 1-10 of the SECOND DIGIT switch 48, diodes 576 and the connected wiper and contacts of 546 of the PC stepper.

When the capacitor 548 in the P-timing and driver circuit 503 times out and the P relay is released, the charged capacitor 560 is disconnected from the charge path by the operated contacts 3-2 of the P relay and is connected to the timing and bias resistors 562-556 by the nonoperated contacts 1-2 of the P relay, thereby applying a signal to the base electrode of transistor 501, biasing it into conduction for an adjustable time interval determined by the setting of resistor 562. In conduction, current flows through the transistor 501 and the coil of the P1 relay between the 0 volt and −43v conductor via diode 578, thereby operating the P1 relay.

Operation of the P1 relay causes its operated contacts 3-2 to close and its nonoperated contacts 1-2 to open, thereby recharging capacitor 548 in the P-timing and driving circuit 503. Significantly, with the P relay nonoperated and the P1 relay operated, the nonoperated contacts 4-5 of the P relay are closed and the operated contacts 6-5 of the P1 relay are closed, thereby connecting the control coil 544 for the PC stepper between the 0 volt conductor and the −48v conductor, thereby causing the PC stepper to advance the wiper arm by one contact.

When capacitor 560 in the P1-timing and driving circuit 505 times out and the P1 relay is released, its nonoperated contacts 1-2 close and the operated contacts 3-2 open, a discharge cycle again occurs in the P-timing and driver circuit 503, causing the P driver transistor 502 to switch into conduction and operate the P relay. Operation of the P relay again closes the circuit up to the counter, indicator and compare circuit 571. If the charge path is completed, the capacitor 560 and the P1-timing and driver circuit 505 is recharged and the operation discussed above is repeated. When the charge path is not completed, caused by the wiper of the stepper reaching the contact for the setting of the digit switch 46 or 48, the capacitor 560 in the P1-timing and driver circuit 505 is not recharged and as a result the P1 relay is not reoperated and the PC stepper is not stepped.

Consider now the operation of the P1-FP flip flop. Reoperation of the AT relay following termination of the operation of the P-P1 flip flop is caused by turn-on of transistor 428 (FIG. 4). As a result, conductor 834 drops towards the potential on the −43v conductor which in turn acts through resistor 580, tending to bias transistor 582 into conduction (FIG. 5). The transistor 582 is connected between the 0 volt conductor and −48v conductor via the offnormal contacts 15-30 of the PC stepper, the coil of the FP relay and the nonoperated contacts 4-5 of the P1 relay. Assuming that the PC stepper has caused a digit greater than 1 to be generated, its wiper is off normal, meaning off contact No. 1, and the contacts 15-30 are closed. The P1-timing and driver circuit 505 is not charged, the P1 relay is not now operated and hence its nonoperated contacts 4-5 are closed, completing the circuit between the 0 volt and −48v conductors through the coil of the FP relay, thereby operating the FP relay. Operation of the FP relay closes its operated contacts 6-5 thereby connecting the coil of the P1 relay between the 0 volt and the −48v conductor, operating the P1 relay. Operation of the P1 relay causes the operated contacts 6-5 to close and, since the P relay is not operated, the nonoperated contacts 4-5 are closed, completing the path between the 0 volt conductor and the −48v conductor through the control coil 544 of the PC stepper, causing it to step one position towards its home position.

Operation of the P1 relay also causes its nonoperated contacts 4-5 to open, thereby releasing the FP relay. Release of the FP relay causes the operated contacts 6-5 of the FP relay to open, releasing the P1 relay. Release of the P1 relay causes the nonoperated contacts 4-5 of the P1 relay to again close and reoperate the FP relay, causing the cycle of operation for the P1-FP flip flop to be repeated.

This action is continued until the PC stepper reaches its 1 or home position. When the PC stepper reaches the home position the offnormal contacts 15-30 of the PC stepper open, opening the operate path for the FP relay, stopping the operation of the P1-FP flip flip.

As indicated above, the P, P1 and FP relays perform some functions not directly related to the dial pulse generation. These functions will now be described.

The P relay is operated by transistor 504 each time a rotary step of the control selector switch is initiated by grounding the ROT conductor 906 (FIG. 2). This occurs because conductor 808 (FIG. 2) is grounded thereby raising the potential on the base electrode of transistor 504 above that on its emitter electrode, switching it into conduction. Operation of the P relay by the transistor 504 causes the T and R conductors (FIG. 2) to remain open-circuit by the nonoperated contacts 10-11 and 7-8 of the P relay. This then causes the T and R conductors to be open-circuit to prevent interference with busy circuits as the selector switch under test is rotated from one trunk to the next in the level being scanned. If the next trunk being scanned is busy, the sleeve lead thereof is grounded and hence a ground signal appears on the S conductor in the test set. As a result, conductor 808 is again grounded and transistor 504 remains on, holding the P relay operated until an idle trunk (with ungrounded sleeve lead) is reached.

The FALSE BUSY circuit input impedance is high and therefore prevents any interference to busy trunks while stepping the control switch across the level.

Other functions of the P1 relay not directly related to the dial pulse generation involve the situation where either battery or ground exists on the SP lead or if a tip and ring lead reversal of the trunk under test is encountered. If trouble (battery or ground) exists on the SP lead, the transistor in the optical coupler 212 (FIG. 2) is operated, thereby applying ground potential to conductor 802. Ground potential on conductor 802 causes ground potential on conductor 830 (FIG. 4) which in turn causes ground potential on the base electrode of transistor 501 via a resistor 584 (FIG. 5) thereby switching the P1 relay driver transistor 501 into conduction and operating the P1 relay. Similarly, if a tip or ring lead voltage reversal exists, a + to − potential exists across the conductors R - T and 804 to 806 conductors and hence the optical coupler 304 is operated which in turn operates the P1 relay driver transistor 501 and hence the P1 relay. The operation of the P1 relay causes its nonoperated contacts 7-8 to open (FIG. 2) and thereby prevent the ground signal on the ROT conductor and hence the control selector switch is left at the faulty bus position.

The ground signal on conductor 830 which causes the P1 relay to be operated, switches transistor 588 into conduction. Conduction of transistor 588 shorts out a portion of the resistors in the timing-bias circuit for the P-timing and driver circuit 503 for the capacitor 548 and thereby provides a fast discharge path for the capacitor. A time delay circuit 586 ensures that the transistor 588 and hence the discharge path is not switched into conduction until after the P1 relay releases. The time delay circuit 586 includes a capacitor resistor delay circuit involving capacitor 589 and resisitors 590, 591 and 592.

A diode 593 is connected between the junction of the resistors 564 and 565 going to the base electrode of transistor 501 and conductor 834 from the AT time delay circuit 506 (FIG. 4). The AT timer is the one which provides the 200–300 milliseconds of A relay seizure time prior to the start of dialing. As long as the AT relay is operated, the transistor 428 (FIG. 4) is in conduction and hence the signal on conductor 834 is approximately −43v. As a result the transistor 501 is held in nonconduction, preventing the P-P1 flip flop from operating. As soon as the AT relay is released, a signal on 834 tending to hold transistor 501 in nonconduction is released, allowing it to operate and thereby operate the P-P1 flip flop.

Consider now some of the other functions of the FP relay. The FP relay prevents the release of the AT relay and hence the AT timer while the P1-FP flip flop is generating pulses and stepping the PC stepper to the home position. This control function is effected through the operated contacts 3-2 of the FP relay which connect a charging path between the 0 volt conductor and the timing capacitor 412 (FIG. 4) via resistor 494 and diode 422. As a result, dial pulses can only be started (by the P relay) when the AT timer and relay release because of the secondary control of the FP relay. When the PC stepper reaches home position the FP relay no longer operates, allowing the AT timer to time-out and provide the required time delay prior to the start of dialing.

The P relay driver transistor 502 (FIG. 5) has two functions in addition to operation of the P relay. Specifically, when transistor 501 is switched on to thereby operate the P relay, current is applied between conductors 822 and 816, energizing the light emitting diode 318a of the optical coupler 318, causing the light sensitive transistor 318b to switch into conduction. Conduction of the transistor 318b causes transistor 306 to be switched into conduction and thereby hold the SL relay operated. Transistor 502 switched on causes the T timer to be reset. The T timer therefore starts timing after the dialing of the digit is completed and the P relay no longer operates.

SLEEVE RELAY AND ROTARY STEP/SECOND DIGIT CONTROL - FIG. 6

FIG. 6 shows the S-sleeve relay and the rotary step/second digit control circuits. The coil of the S relay is connected between the S conductor (contact 3 of the 801 connector) and −48v conductor 814 via resistor 604. Grounding of the sleeve lead and hence the S conductor operates the S relay. When the S relay is operated the nonoperated contacts 4-5 of the S relay are open, removing the discharge path for capacitor 606. When the S relay is released by removal of ground from the sleeve lead, the nonoperated contacts 4-5 close, causing a low resistance discharge path through resistor 608. While the S relay was operated, its operated contacts 6-5 are closed, causing the SD relay to be connected between the 0 volt conductor and the −48v conductor via diode 810, resistor 812 and operated contacts 9-8 of the SD relay. Release of the S relay causes the operated contacts 6-5 to open and thereby release the SD relay. As noted, one side of the coil of the SD relay is connected to 0 volts via the operated contacts 6-5 of the S relay. When the T timer and hence the T relay release, the R rotary relay momentarily operates. This takes place through the nonoperated contacts 1-2 of the T relay which connects charged capacitor 612 across discharge resistors 616 and 618 which in turn switches the R relay driver transistor 620 into conduction, causing current to flow through the operated contacts 2-3 (FIG. 3) of the SL relay from the 0 volt conductor to the −43v conductor. The time interval of operation of the R relay is determined by the discharge time of capacitor 612.

Operation of the R relay closes its nonoperated contacts 3-2 and connects the capacitor 606 between 0 volts and the −43v conductors via charging resistor 622. Operation of the R relay also operates its operated contacts 4-5 (FIG. 3) which in turn causes the transistor 312 to go into nonconduction, raise the signal at conductors 826 and 828 and recharge capacitors 412 and 406 in the AT and T timers.

If only one digit is to be dialed (the TWO DIGIT/ONE DIGIT switch being in the one digit position), the operated R relay closes its operated contacts 5-6 and hence closes the loop between the S conductor (with ground potential) and the ROT conductor, causing the control selector switch to advance one rotary step. If two digits are to be dialed and only the first one is being dialed, the path between the S conductor and the ROT conductor is still open because the SECOND DIGIT/ONE DIGIT switch 36 is in the two digit position and the SD relay is not yet operated.

When the capacitor 612 is discharged to the point where the R relay driver transistor 620 switches into nonconduction, thereby releasing the R relay, the fully charged capacitor 606 is connected via the nonoperated contacts 1-2 of the R relay and diode 626 across thhe coil of the SD relay, causing the SD relay to operate and thus close the operated contacts 9-8 of the SD relay, to the −48v conductor 814. The SD relay remains operated until the S relay releases by having ground removed from the S conductor. Operation of the SD relay causes the nonoperated contacts 4-5 of the SD relay to open, thereby removing the short around the second digit LED 10, causing it to be lit, indicating that the second digit is now being dialed.

The SD relay operates each time the R relay operates and releases but this is of no consequence if only one digit will be dialed, as the first operation of the R relay will cause the selector switch to step to the next idle trunk. Ground is removed from the S conductor, causing the S relay to release when the selector switch steps to the next idle trunk where no ground appears on the sleeve lead and hence on the S conductor.

If the level mode of operation is in effect and hence the LEVE1 switch 30 is in the level hunting position, contacts 1-2 of the level hunting switch 30 are closed and hence when the SD relay operates, the second capacitor 440 (FIG. 4) is connected in parallel with the timing capacitor 406 for the T time delay circuit 404 thereby increasing the T time delay after the second digit has been dialed by approximately 50%. This provides the added time required for test of level hunting connectors.

FALSE BUSY SENSING CIRCUIT - FIG. 7

The false busy sensing circuit of FIG. 7 senses the voltage across the tip and ring leads of the trunk being scanned if a grounded sleeve lead is encountered before the SL (straight loop) relay operates. If there is no voltage drop across the tip or ring leads, whether the trunk is straight or reversed, the circuit will respond by lighting the FB (false busy) LED 22.

In this connection the false busy circuit is energized when the sleeve lead and hence the S conductor (FIG. 2) is grounded. Grounding of the S conductor causes the conductor 812 (FIG. 2) to be grounded. Grounding of conductor 812 into the false busy sensing circuit causes the rest of the circuit reaction to depend on the voltage drop across the T and R conductors and the order of events between the FALSE BUSY INHIBITOR (FBI) conductor 838 and the FALSE BUSY SLEEVE (FBS). Thus if a busy sleeve (S grounded) is encountered, the FBS conductor 836 will be connected to the −43v conductor through transistor 504 (FIG. 5) of the pulse generator circuit. The −43v at the FBS conductor 836 causes a capacitor 702 (FIG. 7) to be connected between the 0 volt conductor and −43v through resistors 704, 706 and 708, thereby charging the capacitor 702. If a false busy condition exists, potential on the T and R conductors will be open or reversed (i.e., − to + from T to R) or open and reversed through the tip and ring leads of the telephone system. As a result either one or both of transistors 710 and 712 will be turned on and in conduction. Conduction of either of transistors 710 and 712 in turn enables transistor 714 to be turned on when the charge in capacitor 702 reaches the nominal turn-on voltage of 7.5v. When transistor 714 turns on, the current through the path from the −43v conductor through resistors 713 and 716 applies a signal across the control electrode of SCR 718, triggering it into conduction and thereby passing current between the −43v conductor and the 0 volt conductor through the FB LED 22. The SCR 718 turns on and remains on until manual operation of either of the FB RLS switch 40 or the RLS switch 42, thereby opening the circuit to −43v conductor.

If a busy condition (grounded sleeve lead) is not encountered in the telephone system, the S conductor is not grounded until after the loop between the T and R conductors (FIG. 2) is closed and hence the SL relay has been operated. As a result the operation of the SL relay connects the FBI conductor to 0 volts potential via conductors 823 and the operated contacts 3-2 of the SL relay (see FIGS. 3 and 6), preventing the capacitor 702 from charging. A resistor 722 and a diode 724 are connected between the capacitor and the FBI conductor, providing a discharge path for the capacitor which is approximately 60 times faster than the charging rate. The discharge path for capacitor 702 between rotary steps is provided by a resistor 726 and a diode 728. The discharge rate provided by resistor 726 and diode 728 is approximately 12 times that of the charge rate.

The tip and ring voltage sensing circuits also provide a means to verify the tip and ring lead continuity of the trunks tested. If the loop is open, as it would be during a dial pulse, both RING BATT and TIP BATT LEDs 16 and 18 turn on, showing the dialing activity. When an open loop is encountered as trouble, the appropriate LED will light, showing the good lead. If the loop is closed either by the loop closing circuit within the test set or by a subscriber (busy circuit), the LEDs will be dark. Diodes 730, 731, 732 and 733 are arranged so reversing the T and R conductors has no effect on the two voltage level sensing circuits. One voltage level sensing circuit consists of the following components: resistor 740, capacitor 738, zener diode 734, diode 735 and transistor 711. This circuit has −48v line 814 as its reference side. The other voltage level sensing circuit consists of the following components: resistor 741, capacitor 739, zener diode 736, diode 737, and transistor 710. This circuit has line FBE (0 volts) as its reference.

Assume a condition with the FBE and T conductors grounded (0 volts) and the R conductor at −48v. This is the condition represented by either a dial pulse or a false busy. The −48v applied to the circuit through diode 732, current limiting resistor 741, zener diode 736, diode 737 and the base-emitter junction of transistor 710 to the FBE causes transistor 710 to switch to the conduction state (turned on), lighting the RING BATT LED 18. If the voltage between the R conductor and the FBE conductor is less than 47 volts (controlled by zener 736), transistor 710 cannot switch on because there is not enough current available to turn it on. This condition represents a busy circuit or an open R conductor.

The ground (0 volts) applied to the T conductor cause a current to flow in diode 730, limiting resistor 740, zener diode 734, diode 735 and emitter-base junction of transistor 711, causing transistor 711 to switch to the conduction state (turned on), lighting TIP GND LED 18. If the voltage between the T conductor and −48v is less than 47 volts (controlled by zener 734), transistor 711 cannot switch on because there is not enough current available to turn it on. This represents a busy circuit or an open T conductor. When transistor 711 turns on it causes transistor 712 to turn on. Either one or both transistors 710 or 712 in the turned on state connects the emitter of transistor 714 to the FBE (0 volts) conductor.

If the turned on condition of transistor 710 or 712 lasts long enough for capacitor 702 to charge up to approximately 7.5v, transistor 714 will switch on causing SCR 718 to turn on and latch, lighting FB22 to show a false busy condition.

What is claimed is:

1. A variable number of pulses generating circuit comprising:
   pulse initiating means;
   a multiple state circuit having first and second states;
   means for delivering a pulse for each occurrence of said first state;
   counting means for counting the occurrence of said second state;
   means for indicating a desired number of pulses, including one or more than one;
   means for enabling the first state of said multiple state circuit either responsive to said pulse initiating means or for each occurrence of said second state; and
   means for enabling said second state of said multiple state circuit upon the concurrence of such indication of a number of pulses greater than one and said first state.

2. A variable number of pulses generating circuit according to claim 1 comprising means for preventing further second states of said multiple state circuit upon a predetermined relation between the states of said counting means and the indication by said desired number of pulses indicating means.

3. A variable number of pulses generating circuit according to claim 1 comprising means for completing a path to said multiple state circuit comprising scanning means having a multiple input/output circuit and a single input/output circuit which is connected one by one to the multiple circuits, means for coupling the multiple circuits to said indicating means, and means for coupling said indicating means and scanning means to said multiple state circuit.

4. A variable number of pulses generating circuit according to claim 2 wherein said indicating means comprises switching means having a single input/output circuit and multiple input/output circuits, each of the multiple input/output circuits of the indicating means being connected to a different one of the multiple input/output circuits of said scanning means and said coupling means coupling the single input/output circuits of said scanning means and of the indicating means to said multiple state circuit for enabling the second state thereof.

5. A variable number of pulses generating circuit according to claim 4 comprising a chargeable time delay circuit for causing said second state of said multiple state circuit, said scanning means and said indicating means providing a charge path to said chargeable time delay circuit.

6. A variable number of pulses generating circuit according to claim 5 wherein said scanning means comprises a stepping relay comprising a rotary contact for said single input/output circuit thereof and a plurality of stationary contacts for the multiple input/output circuits thereof.

7. A variable number of pulses generating circuit according to claim 5 wherein said indicating means comprises a rotary switch comprising a rotary contact for the single input/output circuit thereof and a plurality of stationary contacts for the multiple input/output circuits thereof, the rotary switch of the indicating means comprising a rotary contact which shorts all but the selected stationary contacts together.

8. A variable number of pulses generating circuit according to claim 1 comprising:
 means for indicating a predetermined relation between the states of said counting means and the number of pulses indicated by the counting means; and
 means for causing the multiple state circuit not to reestablish said second state upon the indication of said predetermined relation.

9. A variable number of pulses generating circuit according to claim 8 comprising means for resetting said counting means to an initial state upon such indication of said predetermined relation.

10. A variable number of pulses generating circuit according to claim 1 wherein said multiple state circuit comprises first and second switching means having first and second states; and comprising a further multiple state circuit comprising said second switching means and a further switching means; and means responsive to said further multiple state circuit for resetting said counting means to an initial state thereof after the pulses indicated by said indicating means have been formed.

11. A variable number of pulses generator according to claim 1 comprising:
 second means for indicating a desired number of pulses, including one or more than one, and
 means for coupling the second means for indicating in place of the indicating means upon indication of said predetermined relation and thereby allow further pulses to be formed.

12. A variable number of pulses generating circuit comprising:
 pulse initiating means;
 multiple state circuit means comprising first and second switching means and first and second storage circuits for respectively switching the first and second switching means into first and second conductive states;
 means for delivering a pulse for each second state of the first switching means;
 scanning means comprising a single circuit input/output circuit and a multiple circuit input/output circuit;
 switch means for indicating a desired number of pulses comprising a single circuit input/output circuit and a multiple circuit input/output circuit, the single circuit input/output circuit being settable so as to connect one or more of the multiple circuits together;
 means for coupling the single circuits of the scanning means and of the switch means across the second storage circuit for establishing a storage condition therein which causes the second state of said second switching means;
 means for enabling the first storage circuit to switch said first switching means to the second state thereof responsive either to the pulse initiating means or a second state of said second switching means; and
 means for enabling the second switching means to the second state thereof upon the first switching means assuming the second state thereof.

13. A variable number of pulses generating circuit according to claim 12 for forming first and second groups of pulses, each group with different numbers of pulses, comprising:
 a further switch means comprising
 a single circuit input/output circuit and a multiple circuit input/output circuit, the latter being coupled with each circuit thereof coupled to a different one of the circuits of the multiple circuits of said switch means; and
 means for individually and selectively coupling the single circuit of either the switch means or the further switch means to the second storage circuit.

14. A variable pulse generating circuit comprising:
 pulse initiating means;
 means for indicating desired numbers of pulses, including one or more than one pulse;
 first and second switching means each having first and second states and each normally in a first state thereof;
 means for delivering a pulse for each occurrence of the second state of said first switching means;
 first and second control means operative for switching, respectively, said first and second switching means into the second states thereof and back to the first states,
 said first control means being operated responsive either to the second state of said second switching means or to said pulse initiating means, and said second control means being operative responsive to the concurrence of the indication of a desired number of pulses greater than one and a predetermined condition of said first switching means.

15. A variable pulse generating circuit according to claim 14 comprising means for disabling the operation of said second control means upon delivery of the indicated desired number of pulses greater than one.

16. A variable pulse generating circuit according to claim 15 wherein said disabling means comprises:
 means for counting the second states of said second switching means; and
 means for comparing the state of said counting means with the indicating means and for disabling operation of said second control means upon detecting a predetermined relation.

17. A variable pulse generating circuit according to claim 16 wherein said means for indicating comprises a manually operable switch.

18. A variable pulse generating circuit according to claim 14 wherein said second control means comprises a time delay circuit for switching the second switching means to the second state thereof for a predetermined time delay period and then back to the first state thereof.

19. A variable pulse generating circuit according to claim 18 wherein said time delay circuit comprises a chargeable circuit having a charging and discharging cycle, and operative for switching said second switching means to the second state thereof during one of such cycles, and comprising means for completing a path across said charging circuit to establish one of the states thereof comprising
 a stepper having multiple circuits therefrom and operative for connecting a different one of said multiple circuits to said charging circuit for each step thereof, said indicating means comprising switching means for completing said path across the charging circuit through different ones of said multiple circuits.

20. A pulse generating circuit comprising;
 switch means for forming each such pulse;

means for indicating a desired number of pulses including one or more than one;
counting means;
means for enabling said counting means to only count the formed pulses greater than one;
means for detecting a predetermined relation between the state of said counting means and said indication; and
control means for enabling said switch means to form a pulse responsive either to an applied initiation signal or for each of a plurality of different states of said counting means and for terminating the formation of such pulses by the switch means upon the occurrence of a predetermined relation between the indicating means and the state of the counting means.

21. A test apparatus for forward selector switches in a telephone switching system hving a telephone loop comprising:
means for detecting a preselected operative condition in such a telephone system;
means for generating a variable number of pulses for control of forward selector switches comprising;
switch means for breaking a telephone loop to thereby form such pulse,
means for indicating a desired number of pulses including one or more than one,
counting means,
means for enabling said counting means to only count formed pulses greater than one, and
control means for enabling said switch means to break a telephone loop upon such detection of predetermined operative conditions and for each of different states of said counting means, and for terminating the breaking by the switch means upon the occurrence of a predetermined relation between the indicating means and the counting means.

22. A test apparatus for forward selector switches in a telephone switching system comprising:
means for monitoring such a telephone system for proper operating conditions and for a non busy condition in a telephone loop and responsive thereto forming a dial pulse initiation signal;
means for generating a variable number of pulses for forward selector switches comprising
a multiple state circuit having first and second states,
telephone loop opening and closing means operative for delivering a pulse in a telephone loop responsive to each said first state,
counting means for counting said second states,
means for indicating a desired number of pulses, including one or more than one,
means for enabling the first state of said multiple state circuit either responsive to said initiation signal or for each said second state, and
means for enabling said second state of said multiple state circuit upon concurrence of such indication of a number of pulses greater than one and said first state.

23. A telephone system test apparatus for forward selector switches in a telephone switching system comprising:
means for monitoring such a telephone system for proper operating conditions and a non busy condition in a telephone loop and responsive thereto forming a dial pulse initiation signal; and
means for generating different numbers of dial pulses through a telephone selector switch to forward selector switches comprising
means for indicating a desired number of dial pulses, including one or more than one,
first and second switching means each having first and second states and each normally in a first state thereof, and
telephone loop opening and closing means operative for delivering a dial pulse in a telephone loop as a preselected operative condition is reached by said first switching means, and
first and second control means operative for switching, respectively, said first and second switching means into the second state thereof and back to the first state,
said first control means being operative either as a predetermined operative condition is reached by said seond switching means or responsive to the dial pulse initiation signal, and said second control means being operative upon the concurrence of an indication of a desired number of pulses greater than one and a predetermined operative condition of said first switching means.

24. A telephone system test apparatus for forward switch selector switches in a telephone switching system comprising:
means for monitoring such a telephone system for proper operating conditions and a non busy condition across a telephone loop and responsive thereto forming a dial pulse initiation signal; and
means for generating different numbers of dial pulses through a telephone selector switch to forward selector switches comprising
a multiple state circuit having first and second states,
telephone loop opening and closing means operative for delivering a dial pulse in a telephone loop as a preselected operative condition is reached by said multiple state circuit,
counting means for counting said second states,
means for indicating a desired number of dial pulses, including one or more than one,
means for enabling the first state of said multiple state circuit either responsive to said dial pulse initiation signal or for each of said second states, and means for enabling said second state of said multiple state circuit upon the concurrence of such indication of a number of pulses greater than one and said first state.

25. A telephone system test apparatus according to claim 24 comprising means for preventing further second states of said multiple state circuit upon a predetermined relation between the states of said counting means and the indication by said desired number of pulses indicating means.

26. A telephone system test apparatus according to claim 24 comprising:
means for completing a path to said multiple state circuit comprising scanning means having a multiple circuit input/output circuit and a single circuit input/output circuit which is connectable one by one to the multiple circuits;
means for coupling the multiple circuits to said indicating means; and
means for coupling said indicating means and scanning means to said multiple state circuit.

27. A telephone system test apparatus according to claim 25 wherein said indicating means comprises switching means having a single circuit input/output circuit and a multiple circuit input/output circuit, each multiple circuit being connected to a different one of said multiple circuits of said scanning means; and comprising means for coupling the single circuits of said scanning means and indicating means to said multiple state circuit for enabling the second state thereof.

28. A telephone system test apparatus according to claim 27 comprising a chargeable time delay circuit for causing said second state of said multiple state circuit, said scanning means and said indicating means to provide a charge path to said chargeable time delay circuit.

29. A telephone system test apparatus according to claim 28 wherein said scanning circuit comprises a stepping relay comprising a rotary contact for said single circuit and a plurality of contacts for the multiple circuits thereof.

30. A telephone system test apparatus according to claim 28 wherein said indicating means comprises a rotary switch comprising a rotary contact for the single circuit thereof and a plurality of contacts for the multiple circuits thereof, the rotary switch of the indicating means comprising a rotary contact which shorts all but a selected contact together as it is rotated.

31. A telephone system test apparatus according to claim 24 comprising:

means for indicating a predetermined relation between the states of said counting means and the number of pulses indicated by the means for indicating a desired number of pulses; and
 means for preventing the multiple state circuit from reestablishing said second state upon the indication of said predetermined relation.

32. A telephone system test apparatus according to claim 31 comprising means for resetting said counting means to an initial state upon such indication of said predetermined relation.

33. A telephone system test apparatus according to claim 24 wherein said multiple state circuit comprises first and second switching means having first and second states and comprising a further multiple state circuit comprising said first switching means and a further switching means; and means responsive to said second multiple state circuit for resetting said counting means to an initial state thereof after the pulses indicated by said indicating means have been formed.

34. A telephone system test apparatus according to claim 24 comprising:

second means for indicating a desired number of pulses, including one or more than one; and
 means for coupling the second means for indicating in place of the indicating means upon indication of said predetermined relation and thereby allow further pulses to be formed.

* * * * *

UNITED STATES PATENT AND TRADEMARK OFFICE
CERTIFICATE OF CORRECTION

PATENT NO. : 4,095,058
DATED : June 13, 1978
INVENTOR(S) : Orrin Bernard O'Dea

It is certified that error appears in the above-identified patent and that said Letters Patent are hereby corrected as shown below:

Col. 2, line 27 "in" should be -- is --;
Col. 5, line 23 insert -- to -- before "a";
      line 63, "th" should be -- the --;
Col. 6, line 37, "'stiff' a" should be -- "stiff" A --;
      line 37, insert -- A -- at end of line;
Col. 8, line 35, after "four" insert -- (4) --;
Col. 9, line 4, "in" should be -- and --;
Col. 14, line 32 delete the parenthesis after "A";
Col. 17, line 14 "P-FP" should be -- P1-FP --;
      line 30 "operate time" should be -- operate times --;

Signed and Sealed this

Twenty-sixth Day of December 1978

[SEAL]

Attest:

RUTH C. MASON
*Attesting Officer*

DONALD W. BANNER
*Commissioner of Patents and Trademarks*